United States Patent
Ohishi

(10) Patent No.: US 11,056,961 B2
(45) Date of Patent: Jul. 6, 2021

(54) POWER GENERATOR, INPUT DEVICE, AND LOCK DEVICE WITH SENSOR

(71) Applicant: PANASONIC INTELLECTUAL PROPERTY MANAGEMENT CO., LTD., Osaka (JP)

(72) Inventor: Suguru Ohishi, Okayama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 476 days.

(21) Appl. No.: 16/091,395

(22) PCT Filed: Mar. 27, 2017

(86) PCT No.: PCT/JP2017/012255
§ 371 (c)(1),
(2) Date: Oct. 4, 2018

(87) PCT Pub. No.: WO2017/183391
PCT Pub. Date: Oct. 26, 2017

(65) Prior Publication Data
US 2019/0157960 A1    May 23, 2019

(30) Foreign Application Priority Data

Apr. 19, 2016 (JP) .............................. JP2016-084036

(51) Int. Cl.
*H02K 35/02* (2006.01)
*H02K 7/18* (2006.01)
*E05C 3/00* (2006.01)

(52) U.S. Cl.
CPC .............. *H02K 35/02* (2013.01); *E05C 3/00* (2013.01); *H02K 7/1853* (2013.01); *E05Y 2900/148* (2013.01)

(58) Field of Classification Search
CPC ........ H02K 35/02; H02K 7/1853; E05C 3/00; F03G 5/06; F03G 2730/05
See application file for complete search history.

(56) References Cited

U.S. PATENT DOCUMENTS 9,240,267 B2 * 1/2016 Nagahara .............. H01F 7/0231
2014/0285296 A1 9/2014 Nagahara et al.
2015/0279598 A1 10/2015 Matsumoto et al.

FOREIGN PATENT DOCUMENTS

JP  2015-126559 A   7/2015
WO  2013/084409 A1  6/2013
WO  2014/061225 A1  4/2014

OTHER PUBLICATIONS

International Search Report and Written Opinion issued in International Patent Application No. PCT/JP2017/012255, dated Jun. 13, 2017; with partial English translation.

* cited by examiner

*Primary Examiner* — Viet P Nguyen
(74) *Attorney, Agent, or Firm* — McDermott Will and Emery LLP

(57) ABSTRACT

A power generating unit includes a mover moving in conjunction with the movable member and converts kinetic energy of the mover into electrical energy. As an operating member moves in such a direction that a first pressing portion comes closer toward a second holding portion while the movable member is located at a first position, a spring member is compressed by the first pressing portion and the second holding portion and generates restoring force that causes the movable member to move toward a second position. As the operating member moves in such a direction that the second pressing portion comes closer toward the first holding portion while the movable member is located at the second position, the spring member is compressed by the second pressing portion and the first holding portion and generates restoring force that causes the movable member to move toward the first position.

12 Claims, 12 Drawing Sheets

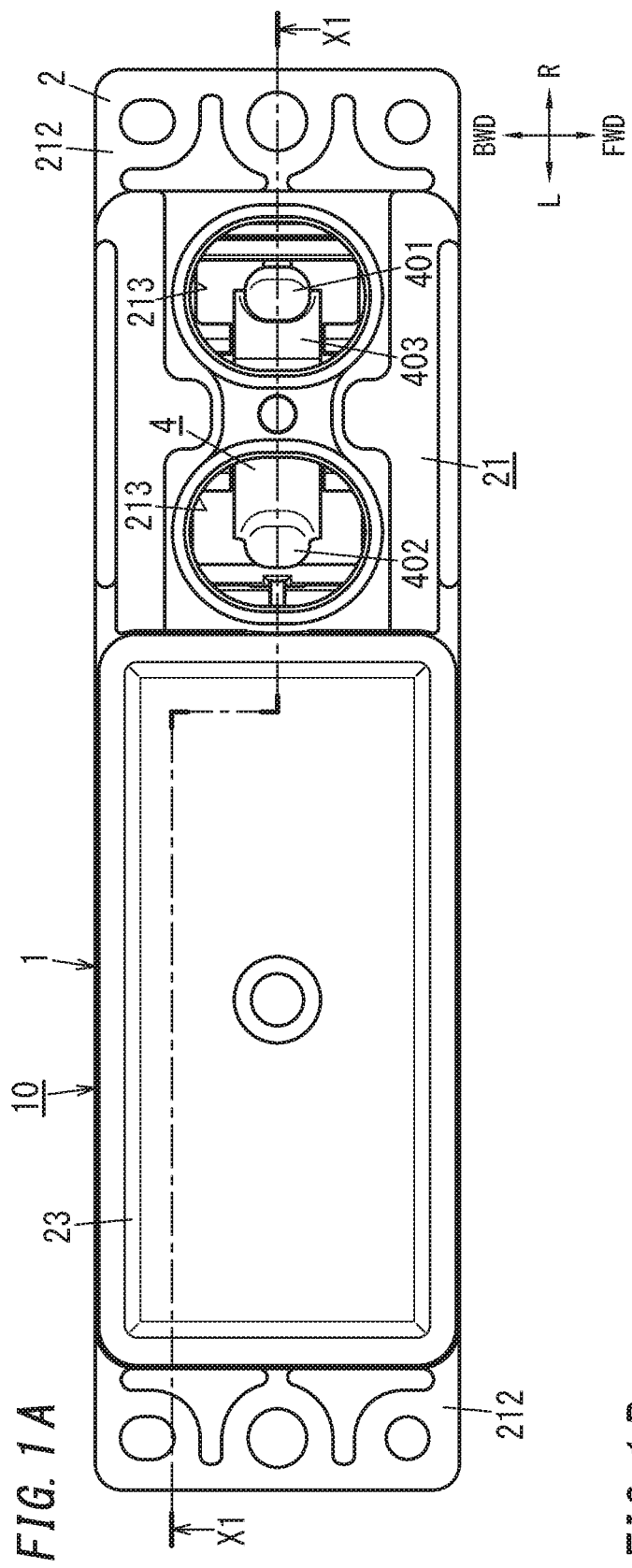
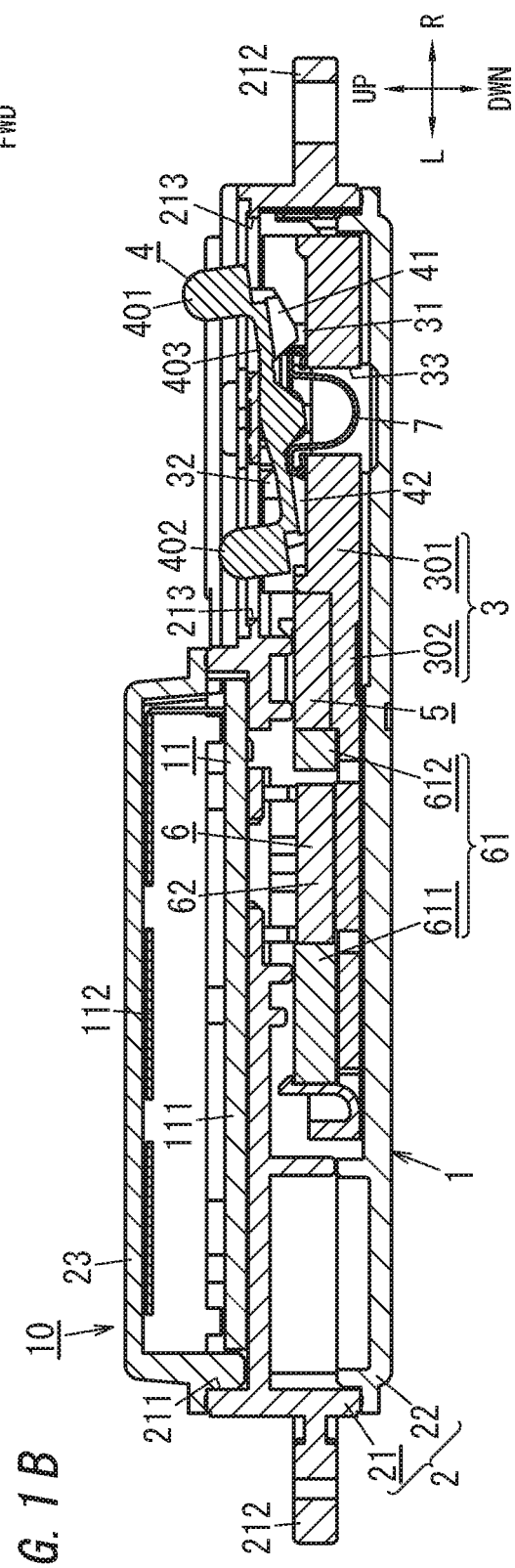
FIG. 1A
FIG. 1B

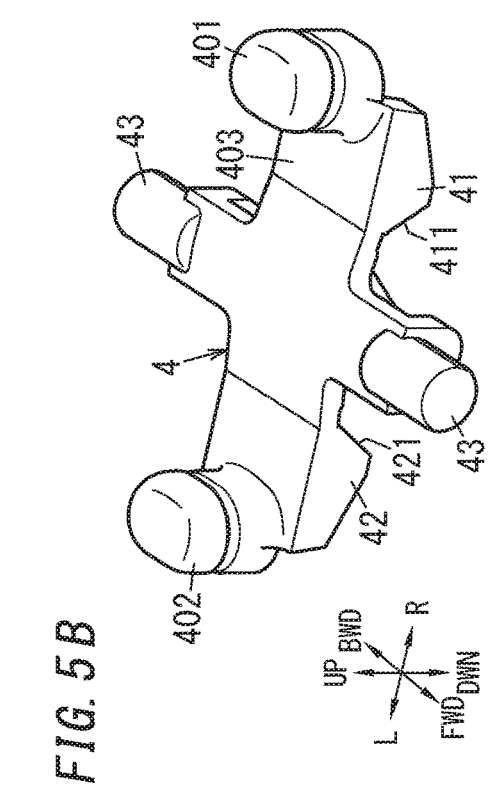
FIG. 5A
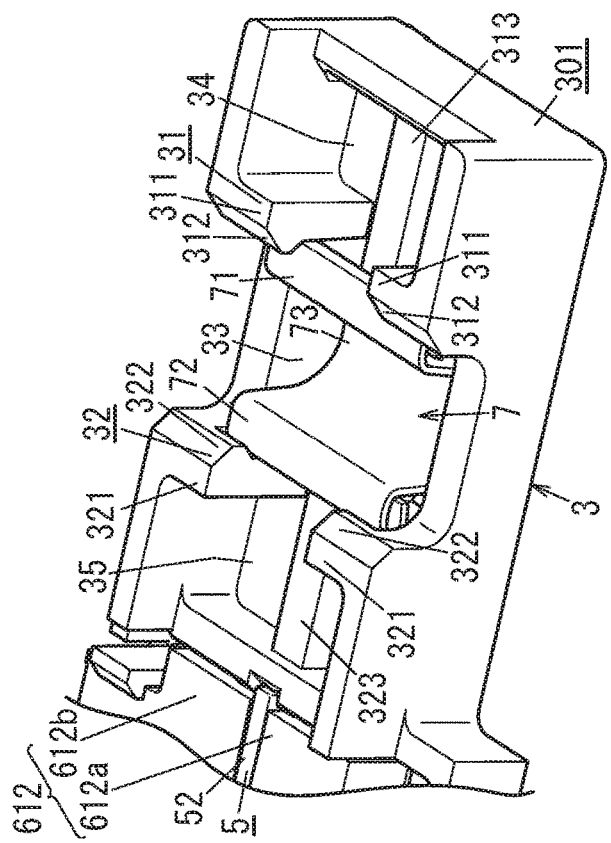
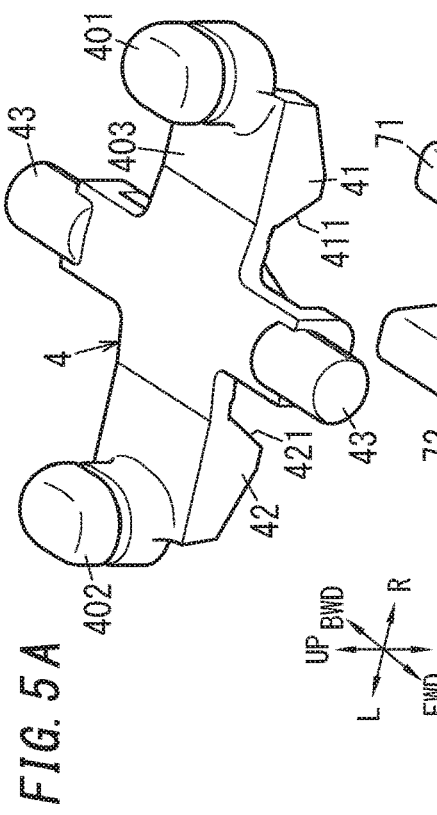
FIG. 5B
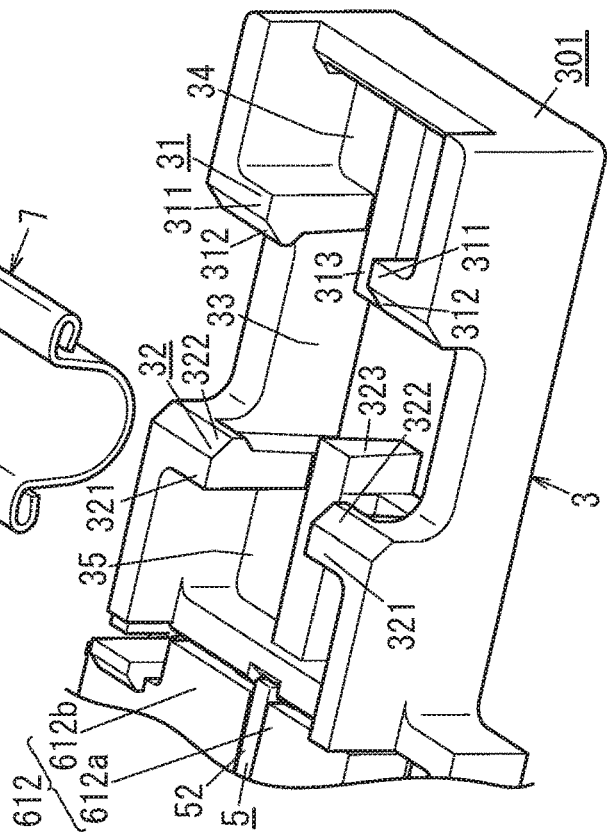

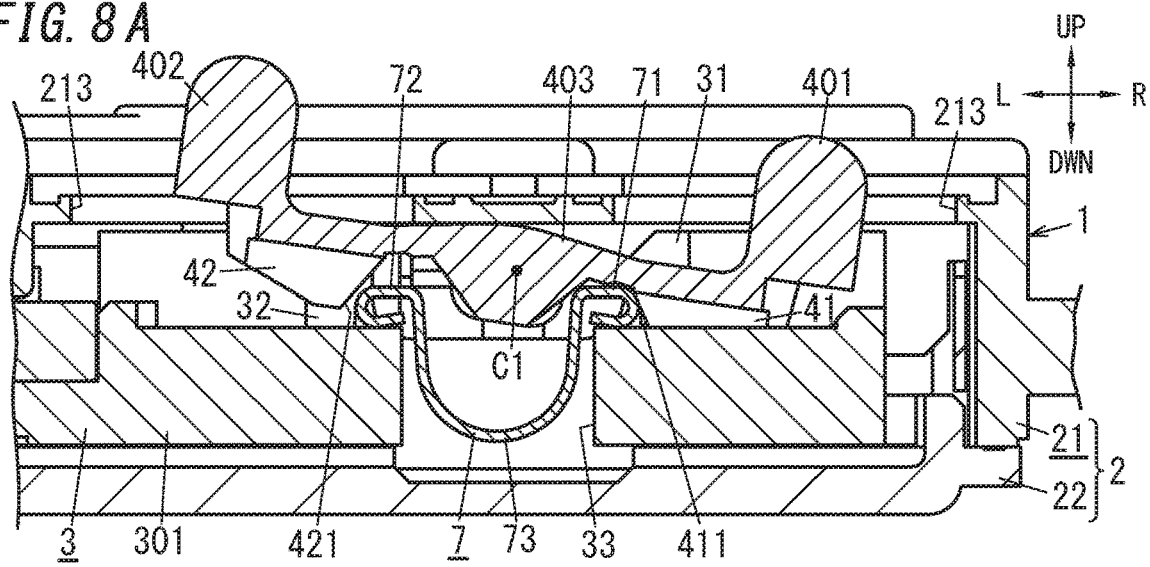
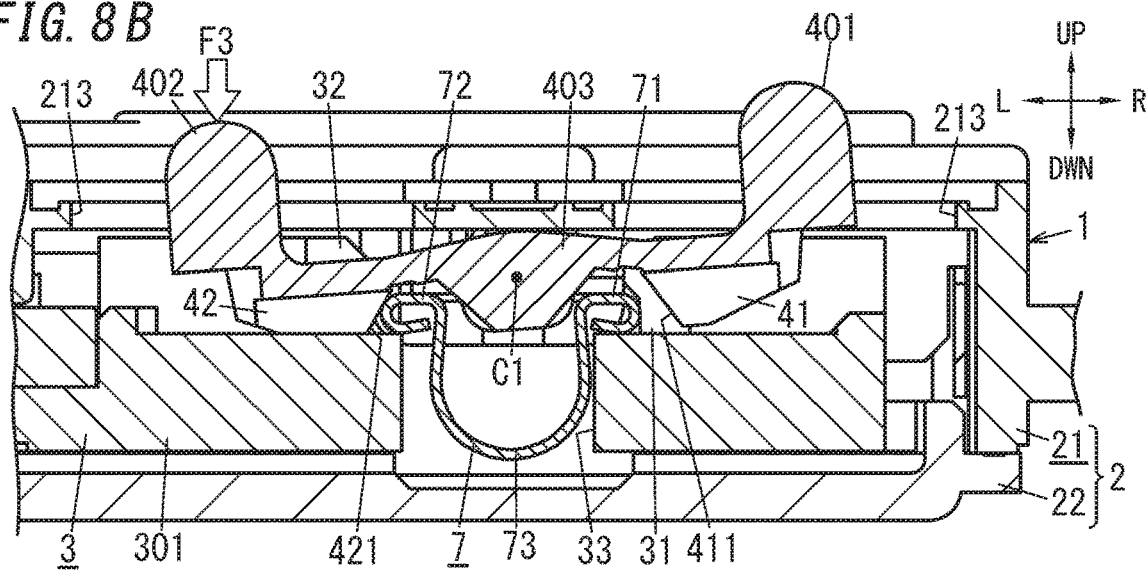
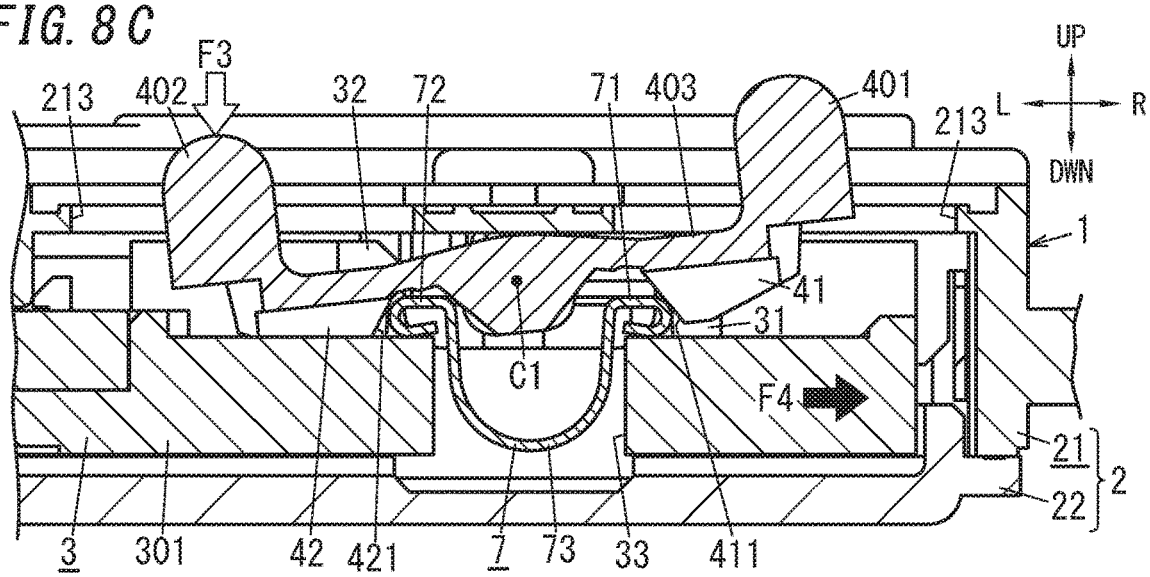

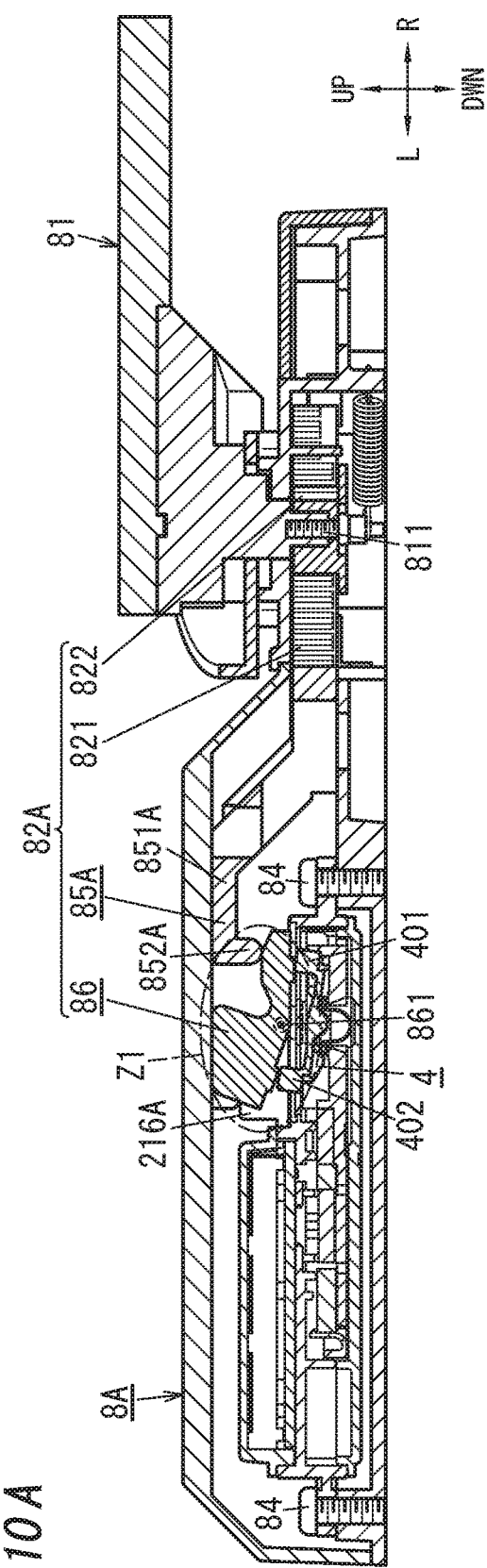
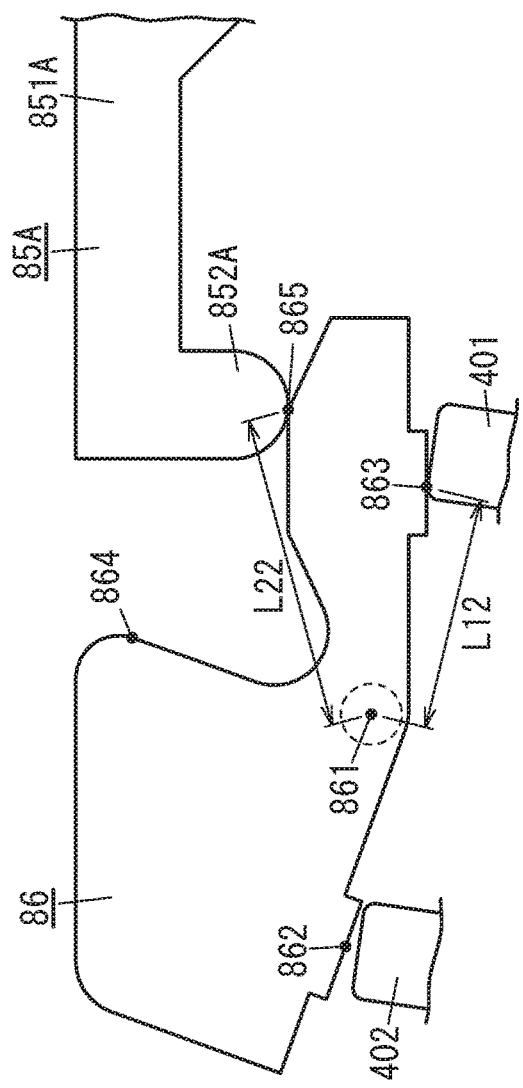
FIG. 10A
FIG. 10B

POWER GENERATOR, INPUT DEVICE, AND LOCK DEVICE WITH SENSOR

CROSS-REFERENCE OF RELATED APPLICATIONS

This application is the U.S. National Phase under 35 U.S.C. § 371 of International Patent Application No. PCT/JP2017/012255, filed on Mar. 27, 2017, which in turn claims the benefit of Japanese Application No. 2016-084036, filed on Apr. 19, 2016, the entire disclosures of which Applications are incorporated by reference herein.

TECHNICAL FIELD

The present invention generally relates to a power generator, an input device, and a lock device with sensor, and more particularly relates to a power generator and input device configured to generate electricity by converting a mover's kinetic energy, generated by the movement of an operating member, into electrical energy, and a lock device with sensor including the input device.

BACKGROUND ART

A power generator, including a movable member that moves by using the restoring force of a spring member, has been known in the art (see, for example, Patent Literature 1).

The power generator disclosed in Patent Literature 1 includes an operating member (a press button), a movable member (a slider), two spring members (a first spring and a second spring), two permanent magnets (a first permanent magnet and a second permanent magnet), and a power generating unit. While the operating member is not operated, the movable member is kept immobile with good stability under magnetic attraction of the permanent magnets. Operating the operating member in such a state allows the magnetic attraction by one of the permanent magnets to be canceled by the restoring force of one spring member (i.e., the first spring), thus moving the movable member to the right. On the other hand, stopping operating the operating member allows the magnetic attraction by the other permanent magnet to be canceled by the restoring force of the other spring member (i.e., the second spring), thus moving the movable member to the left.

In the power generator disclosed in Patent Literature 1, when the movable member moves, the direction of a magnetic flux passing through a core (first yoke member) of the power generating unit changes, generating electromotive force in a coil arranged on the outer periphery of the core.

However, conventional power generators like this require providing two separate spring members (first spring and second spring) for moving the movable member in one direction (to the right) and for moving the same movable member in the other direction (to the left), respectively. This increases the number of spring members to provide, thus possibly posing an obstacle to simplifying the structure, and reducing the overall size, of the power generator.

CITATION LIST

Patent Literature

Patent Literature 1: WO 2014/061225 A1

SUMMARY OF INVENTION

In view of the foregoing background, it is therefore an object of the present invention to provide a power generator, an input device, and a lock device with sensor, all of which are configured to have a simplified structure and a reduced overall size.

A power generator according to a first aspect of the present invention includes a stationary member, a movable member, an operating member, a permanent magnet, a power generating unit, and a spring member. The movable member is movable in a predetermined direction between a first position and a second position with respect to the stationary member. The operating member is movable with respect to the stationary member separately from the movable member. The permanent magnet generates magnetic attraction to hold the movable member at each of the first position and the second position. The power generating unit includes a mover moving in conjunction with the movable member and converts kinetic energy of the mover into electrical energy. The spring member is held by the movable member and transmits force from the operating member to the movable member. The movable member includes a first holding portion and a second holding portion, which are spaced apart from each other in the predetermined direction and which are located closer to the first position and the second position, respectively. The movable member is configured to hold the spring member by interposing the spring member between the first holding portion and the second holding portion. The operating member includes a first pressing portion and a second pressing portion, which are spaced apart from each other in the predetermined direction and which are located closer to the first position and the second position, respectively. The first pressing portion is arranged at such a position as to interpose the spring member between the first pressing portion itself and the second holding portion when the movable member is located at the first position. The second pressing portion is arranged at such a position as to interpose the spring member between the second pressing portion itself and the first holding portion when the movable member is located at the second position. The spring member is configured to, as the operating member moves in such a direction that the first pressing portion comes closer toward the second holding portion while the movable member is located at the first position, be compressed by the first pressing portion and the second holding portion and generate restoring force that causes the movable member to move toward the second position. The spring member is configured to, as the operating member moves in such a direction that the second pressing portion comes closer toward the first holding portion while the movable member is located at the second position, be compressed by the second pressing portion and the first holding portion and generate restoring force that causes the movable member to move toward the first position.

In a power generator according to a second aspect of the present invention, which may be implemented in conjunction with the first aspect described above, the spring member is a leaf spring having a first end portion and a second end portion at both ends thereof in the predetermined direction, and the spring member further includes a curved portion, of which curvature makes the spring member raised in its thickness direction, and which is located between the first end portion and the second end portion.

In a power generator according to a third aspect of the present invention, which may be implemented in conjunction with the first or second aspect described above, the first holding portion includes a pair of first holding pieces spaced apart from each other in a width direction perpendicular to the predetermined direction. The first holding portion is configured to make the pair of first holding pieces come into contact with the spring member. The second holding portion includes a pair of second holding pieces spaced apart from each other in the width direction. The second holding portion is configured to make the pair of second holding pieces come into contact with the spring member. The first pressing portion is located between the pair of first holding pieces in the width direction, and the second pressing portion is located between the pair of second holding pieces in the width direction.

In a power generator according to a fourth aspect of the present invention, which may be implemented in conjunction with any one of the first to third aspects described above, the movable member is held by the stationary member so as to be movable linearly in the predetermined direction.

In a power generator according to a fifth aspect of the present invention, which may be implemented in conjunction with any one of the first to fourth aspects described above, the operating member is held by the stationary member so as to be rotatable between a first operating position and a second operating position. The operating member is configured to move from the first operating position to the second operating position in such a direction that the first pressing portion comes closer toward the second holding portion and that the second pressing portion goes away from the first holding portion. The operating member is configured to move from the second operating position to the first operating position in such a direction that the second pressing portion comes closer toward the first holding portion and that the first pressing portion goes away from the second holding portion.

In a power generator according to a sixth aspect of the present invention, which may be implemented in conjunction with the fifth aspect described above, the operating member is configured to be movable with respect to the stationary member so as to move the first pressing portion and the second pressing portion in an operating direction intersecting with the predetermined direction. The first pressing portion has a first sloped surface, which is sloped with respect to the operating direction and located at such a position as to face the second holding portion in the predetermined direction such that as the first pressing portion moves in the operating direction, distance to the second holding portion changes in the predetermined direction. The second pressing portion has a second sloped surface, which is sloped with respect to the operating direction and located at such a position as to face the first holding portion in the predetermined direction such that as the second pressing portion moves in the operating direction, distance to the first holding portion changes in the predetermined direction.

In a power generator according to a seventh aspect of the present invention, which may be implemented in conjunction with any one of the first to sixth aspects described above, the power generating unit further includes: a core; and a coil wound around the core. The power generating unit is configured to generate power from the coil by causing a direction of magnetic flux passing through the core to change as the mover moves.

In a power generator according to an eighth aspect of the present invention, which may be implemented in conjunction with the seventh aspect described above, the mover includes a first movable piece and a second movable piece, which are located on both sides in the predetermined direction with respect to the core. The first movable piece is configured to be in contact with the core when the movable member is located at the first position. The second movable piece is configured to be in contact with the core when the movable member is located at the second position. The permanent magnet includes a first magnet secured to the first movable piece and a second magnet secured to the second movable piece.

A power generator according to a ninth aspect of the present invention, which may be implemented in conjunction with any one of the first to eighth aspects described above, further includes a handle rotatable between a first rotational position and a second rotational position. The handle includes a fulcrum serving as a rotational axis of the handle, a point of load located at a first distance from the fulcrum, and a point of effort located at a second distance, which is longer than the first distance, from the fulcrum. The handle is configured to, when force is applied at the point of effort, turn from the first rotational position to the second rotational position, apply force to the operating member at the point of load, and thereby move the operating member.

An input device according to a tenth aspect of the present invention includes: the power generator according to any one of the first to ninth aspects described above; and a signal processing circuit electrically connected to the power generating unit and configured to output a signal by using the electrical energy generated by the power generating unit in response to operation of the operating member.

A lock device with sensor according to an eleventh aspect of the present invention includes: the input device according to the tenth aspect described above; a crescent lock; and a link mechanism configured to interlock the operating member with the crescent lock.

In a lock device with sensor according to a twelfth aspect of the present invention, which may be implemented in conjunction with the eleventh aspect, the link mechanism includes: a press member interlocked with the crescent lock; and a lever member rotatable between a first rotational position and a second rotational position. The lever member includes a link fulcrum serving as a rotational axis of the lever member, a point of link load located at a first distance from the link fulcrum, and a point of link effort located at a second distance, which is longer than the first distance, from the link fulcrum. The lever member is configured to, when force is applied by the press member at the point of link effort, move from the first rotational position to the second rotational position, apply force to the operating member at the point of link load, and thereby interlock the operating member with the crescent lock.

BRIEF DESCRIPTION OF DRAWINGS

FIG. 1A is a plan view of an input device including a power generator according to an embodiment of the present invention, illustrating a state where its movable member is located at a first position, and FIG. 1B is a cross-sectional view thereof taken along the plane X1-X1 shown in FIG. 1A;

FIG. 5A is an exploded perspective view of a principal part of the power generator, illustrating a state where an operating member and a spring member are removed from the movable member, and FIG. 5B is an exploded perspective view of the principal part of the power generator, illustrating a state where the operating member is removed from the movable member;

FIGS. 8A-8C illustrate how the power generator operates while the movable member thereof is moving from the second position to the first position;

FIG. 10A is a cross-sectional view illustrating an unlocked state of the lock device with sensor, and FIG. 10B is an enlarged view of the region Z1 shown in FIG. 10A;

DESCRIPTION OF EMBODIMENTS

Figures 2A, 2B:
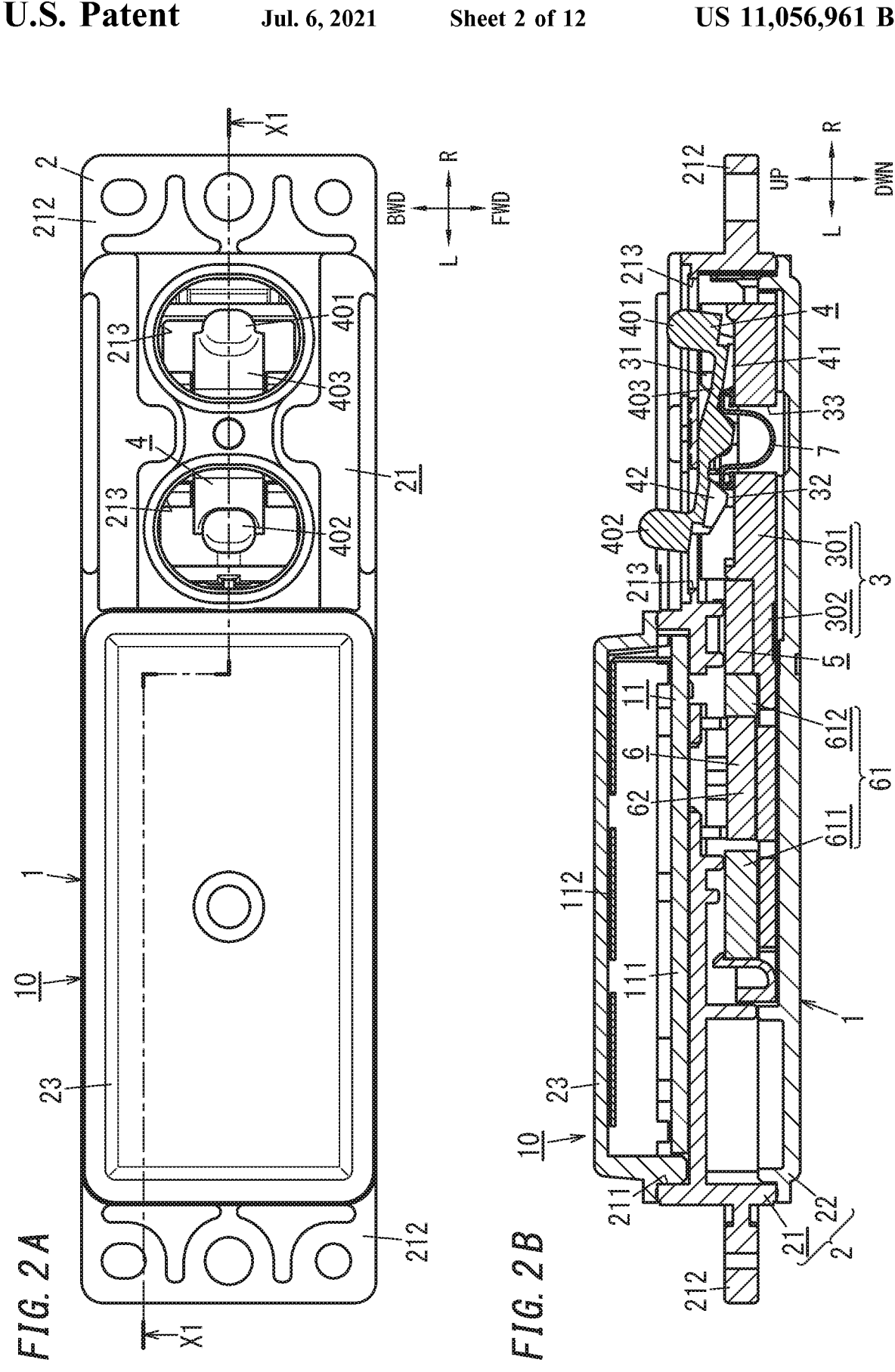
FIG. 2A is a plan view of the input device, illustrating a state where its movable member is located at a second position.
FIG. 2B is a cross-sectional view thereof taken along the plane X1-X1 shown in FIG. 2A.

Before embodiments are described, a demand in the current market for the development of alternative power generators will be briefly described. Recently, a steep rise in the number of power plants using, as raw materials, fossil fuels (mostly petroleum) is generating a great concern for inevitable depletion of fossil fuels in the near future. Thus, to cope with this problem, there has been a growing demand for the development of autonomous power generators that do not use fossil fuels. Examples of known autonomous power generators include hydroelectric, solar, wind, and geothermal power generators, all of which require a large-scale facility.

Meanwhile, a switching power generator, designed to generate electricity by converting a mover's kinetic energy, generated by operating (moving) an operating member, into electrical energy, does not require any such large-scale facilities, and may be implemented in a much smaller size than any of the hydroelectric, solar, wind, or geothermal power generator. That is why the switching power generator has a potential of being built in an electronic device of a relatively small size. Nevertheless, the amount of electricity generated by a power generator of this type may vary according to the moving velocity of its movable member. For that reason, a so-called "quick action mechanism" designed to allow the movable member to move relatively quickly irrespective of the moving velocity of the operating member by moving the movable member with the restoring force of a spring member is sometimes applied to this type of power generator. In such a power generator adopting the quick action mechanism, as the operating member is operated (moved), the spring member is deformed to store energy in itself, which is used to move the movable member. This allows the movable member to move relatively quickly, thus ensuring a stable amount of electricity generated.

Embodiments to be described below are those of an exemplary switching power generator configured to have a simplified structure and a reduced overall size with the quick action mechanism adopted.

Embodiments (1) Overview

As shown in FIGS. 1A and 1B, a power generator 1 according to this embodiment includes a stationary member 2, a movable member 3, an operating member 4, permanent magnets 5, a power generating unit 6, and a spring member 7.

The movable member 3 is configured to be movable in a predetermined direction (e.g., horizontally in the example illustrated in FIG. 1A) with respect to the stationary member 2. The movable member 3 is movable between a first position (e.g., the position shown in FIG. 1B) and a second position (e.g., the position shown in FIG. 2B). The operating member 4 is configured to be movable with respect to the stationary member 2. The operating member 4 moves separately from the movable member 3. That is to say, the movable member 3 and the operating member 4 are both movable with respect to the stationary member 2, but are mutually independent members and movable individually.

The permanent magnets 5 generate magnetic attraction to hold the movable member 3 at each of the first position and the second position. The power generating unit 6 includes a mover 61 moving in conjunction with the movable member 3 and converts kinetic energy of the mover 61 into electrical energy. The spring member 7 is held by the movable member 3 and transmits force applied via the operating member 4 to the movable member 3.

In this case, the movable member 3 includes a first holding portion 31 (see FIG. 5A) and a second holding portion 32 (see FIG. 5A), which are spaced apart from each other in the predetermined direction and which are located closer to the first position and the second position, respectively. The movable member 3 is configured to hold the spring member 7 by interposing the spring member 7 between the first holding portion 31 and the second holding portion 32.

The operating member 4 includes a first pressing portion 41 and a second pressing portion 42, which are spaced apart from each other in the predetermined direction and which are located closer to the first position and the second position, respectively. The first pressing portion 41 is arranged at such a position as to interpose the spring member 7 between the first pressing portion 41 itself and the second holding portion 32 when the movable member 3 is located at the first position. The second pressing portion 42 is arranged at such a position as to interpose the spring member 7 between the second pressing portion 42 itself and the first holding portion 31 when the movable member 3 is located at the second position.

The spring member 7 is configured to, as the operating member 4 moves in such a direction that the first pressing portion 41 comes closer toward the second holding portion 32 while the movable member 3 is located at the first position, be compressed by the first pressing portion 41 and the second holding portion 32 and generate restoring force that causes the movable member 3 to move toward the second position. The spring member 7 is also configured to, as the operating member 4 moves in such a direction that the second pressing portion 42 comes closer toward the first holding portion 31 while the movable member 3 is located at the second position, be compressed by the second pressing portion 42 and the first holding portion 31 and generate restoring force that causes the movable member 3 to move toward the first position.

As used herein, the "predetermined direction" refers to a direction in which the movable member 3 moves. In this exemplary embodiment, the movable member 3 moves linearly between the first position and the second position. Thus, the direction defined by the line segment that connects the first and second positions together is the "predetermined direction."

The operation of the power generator 1 with such a configuration will be described briefly. Where the movable member 3 is located at the first position, the magnetic attraction of the permanent magnets 5 holds the movable member 3 at the first position. Operating the operating member 4 to allow the operating member 4 to move in such a state, for example, displaces the first pressing portion 41 toward the second holding portion 32, thus compressing the spring member 7 interposed between the first pressing portion 41 and the second holding portion 32. In this case, deformation of the spring member 7 stores energy in the spring member 7, causing the spring member 7 to produce restoring force. When a gradual increase in the degree of displacement of the first pressing portion 41 makes the restoring force of the spring member 7 greater than the magnetic attraction of the permanent magnets 5, the permanent magnets 5 lose their hold on the movable member 3, thus allowing the movable member 3 to move from the first position toward the second position under the restoring force of the spring member 7.

On the other hand, where the movable member 3 is located at the second position, the magnetic attraction of the permanent magnets 5 holds the movable member 3 at the second position. Operating the operating member 4 to allow the operating member 4 to move in such a state, for example, displaces the second pressing portion 42 toward the first holding portion 31, thus compressing the spring member 7 interposed between the second pressing portion 42 and the first holding portion 31. In this case, deformation of the spring member 7 stores energy in the spring member 7, causing the spring member 7 to produce restoring force. When a gradual increase in the degree of displacement of the second pressing portion 42 makes the restoring force of the spring member 7 greater than the magnetic attraction of the permanent magnets 5, the permanent magnets 5 lose their hold on the movable member 3, thus allowing the movable member 3 to move from the second position toward the first position under the restoring force of the spring member 7.

Thus, in the power generator 1 according to this embodiment, operating (moving) the operating member 4 makes the movable member 3 move between the first position and the second position, thus allowing the power generating unit 6 to convert the kinetic energy of the mover 61, moving in conjunction with the movable member 3, into electrical energy. In addition, this power generator 1 adopts the quick action mechanism in which the movable member 3 moves by using the restoring force of the spring member 7. Therefore, the movable member 3 is able to move relatively quickly irrespective of the moving velocity of the operating member 4. Thus, this power generator 1 allows the movable member 3 to move at a relatively stabilized velocity, ensuring a stable amount of electricity generated.

The power generator 1 according to this embodiment is applicable to an input device 10 as shown in FIGS. 1A and 1B. Specifically, the input device 10 of this embodiment includes the power generator 1 and a signal processing circuit 11. The signal processing circuit 11 is electrically connected to the power generating unit 6 of the power generator 1, and configured to output a signal by using the electrical energy generated by the power generating unit 6 in response to operation of the operating member 4. This allows the input device 10 to operate the signal processing circuit 11 with the power generated by the power generating unit 6 as the operating member 4 is operated (or moved). Thus, there is no need to supply power separately from a cell, a battery, a utility power supply, or any other type of power supply to the input device 10.

Considering the frictional force produced between the movable member 3 and the stationary member 2, strictly speaking, the movable member 3 moves when the restoring force of the spring member 7 exceeds the sum of the frictional force and the magnetic attraction of the permanent magnets 5. In the following description of embodiments, however, the frictional force between the movable member 3 and the stationary member 2 is supposed to be negligibly small.

(2) Specifics

A power generator 1 according to this embodiment and an input device 10 including the power generator 1 will be described in further detail with reference to the accompanying drawings. Note that the embodiments to be described below are only an example of the present invention and should not be construed as limiting. Rather, numerous modifications or variations can be readily made by those skilled in the art depending on their design choice or any other factor without departing from the true spirit and scope of the invention.

In this embodiment, the operating member 4 includes a first button 401 and a second button 402, which are spaced apart from each other in the predetermined direction and may be pressed down in an operating direction. As used herein, the "operating direction" is a direction intersecting with the "predetermined direction" that defines the direction in which the movable member 3 moves. In the following description, the "predetermined direction" is herein supposed to be the horizontal direction and the "operating direction" is herein supposed to be the vertical direction, unless otherwise stated. Furthermore, the movement direction of the movable member 3 moving from the first position (see FIG. 1B) toward the second position (see FIG. 2B) is supposed to be the leftward direction, and the direction in which the first button 401 and the second button 402 are pressed is supposed to be the downward direction. That is to say, in the following description, the upward, downward, rightward, and leftward directions are defined just as indicated by the "up," "down," "right," and "left" arrows in FIG. 1B and other drawings. Also, in the following description, the directions perpendicular to the paper on which FIG. 1B is drawn are supposed to be the forward and backward directions, respectively, and the direction toward you is supposed to be the forward direction. Thus, the forward and backward directions are defined just as indicated by the "front" and "back" arrows in FIG. 1A and other drawings. However, these directions are only an example and should not be construed as limiting the directions in which the power generator 1 is used. It should also be noted that the arrows indicating the respective directions on the drawings are shown there only for the purpose of description and insubstantial ones.

Furthermore, in the following description of embodiments, the "predetermined direction" and the "operating direction" are supposed to be perpendicular to each other. Note, however, that "being perpendicular" refers herein to not only a state where the two directions intersect with each other exactly at right angles but also a state where the two directions intersect with each other substantially at right angles within a certain tolerance range. In this description, the phrase "being perpendicular" will be used in a similar sense.

(2.1) Input Device

First of all, an input device 10 including the power generator 1 will be described with reference to FIGS. 1A-4. FIG. 1B is a cross-sectional view taken along the plane X1-X1 shown in FIG. 1A. FIG. 2B is a cross-sectional view taken along the plane X1-X1 shown in FIG. 2A.

The input device 10 includes the power generator 1 and the signal processing circuit 11, which are assembled and integrated together. In this embodiment, the stationary member 2 of the power generator 1 has a rectangular parallelepiped shape, which is elongated in the horizontal direction, and defines a housing in which respective constituent members of the power generator 1 are able to be housed. The input device 10 further includes an upper cover 23 to be joined to the stationary member 2.

The stationary member 2 is made of a synthetic resin. The stationary member 2 includes a first case 21 and a second case 22. The first case 21 is formed in the shape of a box with a bottom opening. The second case 22 has a rectangular plate shape and is joined to the first case 21 so as to close the opening of the first case 21. In this manner, vertically joining and combining the first case 21 and the second case 22 together forms the stationary member 2. From both horizontal end faces of the first case 21, a pair of attachment pieces 212 protrudes to attach the stationary member 2 to an object of attachment.

The first case 21 and the second case 22 may be joined together by laser welding, for example. This significantly reduces the chances of water, moisture, or anything harmful entering the inner space surrounded with the first case 21 and the second case 22 through the junction between the first case 21 and the second case 22. In addition, the input device 10 includes the power generator 1, and therefore, needs no cells, batteries, or any other built-in power storage devices. That is to say, there is no need to leave any space for housing the cells or batteries in the input device 10, and there is no need to provide any openable and closable lid that allows access to that space for the stationary member 2.

The upper surface of the first case 21 has a pair of through holes 213, which are arranged side by side horizontally. Each of the pair of through holes 213 defines an oval opening, of which the major axis runs in the forward and backward directions, and vertically runs through the first case 21. The pair of through holes 213 is provided to expose the operating member 4 of the power generator 1 through the upper surface of the first case 21.

The operating member 4 includes the first button 401 and the second button 402, which are horizontally spaced apart from each other. While the operating member 4 is held movably with respect to the stationary member 2, the first button 401 protrudes through the right one 213 of the pair of through holes 213, and the second button 402 protrudes through the left one 213 of the pair of through holes 213. The operating member 4 is held by the stationary member 2 so as to be rotatable between a first operating position (i.e., the position shown in FIGS. 1A and 1B) and a second operating position (i.e., the position shown in FIGS. 2A and 2B). In this embodiment, the operating member 4 is made of a synthetic resin, and the first button 401 and the second button 402 are formed integrally with the operating member 4.

When located at the first operating position, the operating member 4 is tilted diagonally to the right with respect to the upper surface of the first case 21 such that the first button 401 is located above the second button 402. Pressing the first button 401 downward in such a state allows the operating member 4 to rotate around a rotational axis C1 (see FIG. 6) to the second operating position. In this case, the first button 401 moves down and the second button 402 moves up. On the other hand, when located at the second operating position, the operating member 4 is tilted diagonally to the left with respect to the upper surface of the first case 21 such that the second button 402 is located above the first button 401. Pressing the second button 402 downward in such a state allows the operating member 4 to rotate around the rotational axis C1 to the first operating position. In this case, the second button 402 moves down and the first button 401 moves up. In short, the operating member 4 rotates bidirectionally around the rotational axis C1, seesawing between the first operating position and the second operating position.

Optionally, a waterproof rubber sheet with sufficient flexibility may be secured to around the pair of through holes 213 on the upper surface of the first case 21. The waterproof rubber sheet has two holes to pass the first button 401 and the second button 402 through. The waterproof rubber sheet may fill the gap between the respective peripheries of the pair of through holes 213 and the first and second buttons 401 and 402. This reduces the chances of water, moisture, or anything harmful entering this input device 10 through the pair of through holes 213.

The signal processing circuit 11 is housed in a housing recess 211 on the upper surface of the first case 21. The housing recess 211 is located on the left of the pair of through holes 213 on the upper surface of the first case 21. To the upper surface of the first case 21, the upper cover 23 is joined to close the opening of the housing recess 211. This allows the signal processing circuit 11 to be housed between the bottom of the housing recess 211 and the upper cover 23. The upper cover 23 is made of a synthetic resin. The first case 21 and the upper cover 23 may be joined together by laser welding, for example. This reduces the chances of water, moisture, or anything harmful entering the housing recess 211 through the junction between the first case 21 and the upper cover 23.

The signal processing circuit 11 includes a printed circuit board 111, an antenna 112, and various electronic components assembled and integrated together on the printed circuit board 111. Those electronic components integrated together on the printed circuit board 111 serve as a power supply circuit, a control circuit, a memory, a transmission circuit, and other components, for example. The antenna 112 is mounted to the upper surface of the printed circuit board 111. On the lower surface of the printed circuit board 111, provided are connecting pads for electrically connecting the power generating unit 6 and a ground conductor 113 (to be described later). The bottom surface of the housing recess 211 has a first connection port 214, which vertically runs through the first case 21 and which will be positioned to face a coil 63 (to be described later) of the power generating unit 6. Through this first connection port 214, the power generating unit 6 is electrically connected to the signal processing circuit 11. In addition, the bottom surface of the housing recess 211 also has a pair of second connection ports 215, which also vertically runs through the first case 21 and which will be positioned to face the ground conductor 113. Through this pair of second connection ports 215, the ground conductor 113 is electrically connected to the signal processing circuit 11.

The signal processing circuit 11 is operated by the power generated by the power generating unit 6. In addition, the signal processing circuit 11 uses the power generated by the power generating unit 6 as an electrical signal and generates detection information in accordance with the electrical signal. The signal processing circuit 11 transmits the detection information thus generated from the antenna 112 to a receiver by wireless communication using a radio wave as a transmission medium. Examples of communication methods to be adopted by the signal processing circuit 11 include Wi-Fi™, Bluetooth™, and Specified Low Power Radio, which is a low power radio requiring no licenses or registration and using radio waves falling within the 420 MHz band or the 920 MHz band in Japan, for example.

As will be described in detail later for the section "(2.2) Power generator," in this power generator 1, as the operating member 4 moves with respect to the stationary member 2, the movable member 3 moves, thus making the power generating unit 6 generate power. Depending on the direction of movement of the movable member 3 (which may be either from the first position to the second position or vice versa), an electrical signal with a different property (such as polarity) is output from the power generating unit 6. In accordance with the electrical signal output from the power generating unit 6, the signal processing circuit 11 generates detection information, of which the content varies according to the direction of movement of the movable member 3, and transmits the detection information to the receiver.

Thus, in the input device 10 according to this embodiment, the signal processing circuit 11, receiving the power generated by the power generating unit 6 when the operating member 4 is operated, operates and transmits detection information, carrying data about the operation (movement) of the operating member 4, to the receiver. In this case, the detection information transmitted to the receiver varies according to the direction of movement of the movable member 3. That is to say, the operating member 4 functions as not only an operating member allowing the power generating unit 6 to generate power but also an operating member allowing the signal processing circuit 11 to transmit the detection information. This reduces the number of components required, compared to a configuration in which an operating member allowing the signal processing circuit 11 to transmit detection information is provided separately from the power generating operating member 4 for the power generator 1.

The input device 10 may be used, for example, as a crescent sensor for detecting locking and unlocking of a crescent lock. In that case, the input device 10 is mounted onto a window frame, which is an object of attachment, so that the operating member 4 is indirectly operated by the crescent lock. In the input device 10, the operating state of the operating member 4 varies depending on whether the crescent lock is locked or unlocked. This allows a receiver, receiving detection information from the input device 10, to monitor the state of the crescent lock and determine whether the crescent lock is locked or unlocked.

The signal processing circuit 11 of the input device 10 suitably includes a capacitor. This allows the input device 10 to store the electric charge, generated by the power generating unit 6, in the capacitor and to apply a voltage equal to or higher than the minimum operating voltage of the signal processing circuit 11 to the signal processing circuit 11 with stability.

(2.2) Power Generator

Next, the configuration of the power generator 1 will be described with reference to FIGS. 1A-4.

The power generator 1 includes the stationary member 2 in a horizontally elongated rectangular parallelepiped shape as described above. In the space surrounded with the first case 21 and the second case 22 that form the stationary member 2, housed are constituent members of the power generator 1, namely, the movable member 3, the operating member 4, the permanent magnets 5, the power generating section 6, and the spring member 7.

The movable member 3 is held by the stationary member 2 so as to be movable linearly in the horizontal direction. The movable member 3 moves back and forth between the first position (i.e., the position shown in FIG. 1B) and the second position (i.e., the position shown in FIG. 2B). In this embodiment, the direction of movement of the movable member 3 moving from the first position to the second position is defined to be the leftward direction, and therefore, the second position is a position shifted to the left from the first position, and the first position is a position shifted to the right from the second position. That is to say, in the movable range of the movable member 3, the rightmost position thereof is the first position and the leftmost position thereof is the second position. Therefore, in the horizontal direction, "closer to the first position" herein means "on the right" and "closer to the second position" herein means "on the left."

Specifically, the movable member 3 is housed in the space surrounded with the first case 21 and the second case 22. The movable member 3 includes a first block 301 for holding the spring member 7 and a second block 302 for holding a mover 61 (to be described later) of the power generating unit 6. The first block 301 and the second block 302 are horizontally arranged side by side so that the first block 301 is located on the right. In this embodiment, the movable member 3 is made of a synthetic resin and the first block 301 and the second block 302 form integral parts of the movable member 3.

The movable member 3 is sandwiched between the first case 21 and the second case 22 and thereby has its movement regulated with respect to the stationary member 2. In addition, the upper surface of the second case 22 has a pair of guide grooves 221 extending horizontally. The lower surface of the movable member 3 has protrusions configured to be inserted into the guide grooves 221. Inserting the protrusions of the movable member 3 into the pair of guide grooves 221 regulates the forward and backward movements of the movable member 3 with respect to the stationary member 2. This allows the movable member 3 to move only horizontally with respect to the stationary member 2.

The upper surface of the second case 22 further has a pair of supporting walls 222 to support the operating member 4. The pair of supporting walls 222 face each other in the forward and backward directions and are arranged on both sides of the first block 301 in the forward and backward directions. The upper surface of the second case 22 further has a pair of ribs 223 to support a core 62 (to be described later) of the power generating unit 6. The pair of supporting walls 222 face each other in the forward and backward directions and are arranged to interpose the first block 301 between them. The pair of ribs 223 face each other in the forward and backward directions and are arranged on both sides of the second block 302 in the forward and backward directions.

The first block 301 has a first opening 33 and has a horizontally elongated rectangular frame shape in a plan view. The spring member 7 is housed in the first opening 33. On the right of the first opening 33 on the upper surface of the first block 301, there is a first recess 34. On the left of the first opening 33 on the upper surface of the first block 301, there is a second recess 35. The first block 301 has a first holding portion 31 between the first opening 33 and the first recess 34, and also has a second holding portion 32 between the first opening 33 and the second recess 35. That is to say, the movable member 3 includes the first holding portion 31 and the second holding portion 32 that are horizontally spaced apart from each other and located on the right-hand side (closer to the first position) and on the left-hand side (closer to the second position), respectively. The first block 301 holds the spring member 7 in the first opening 33 so that the spring member 7 is interposed between the first holding portion 31 and the second holding portion 32.

The second block 302 has a second opening 36 and has a horizontally elongated rectangular frame shape in a plan view. A coil 63 (to be described later) of the power generating unit 6 is housed in the second opening 36. The mover 61 (to be described later) of the power generating unit 6 is secured on the right- and left-hand sides of the second opening 36 on the upper surface of the second block 302.

The spring member 7 is a member for transmitting the force applied from the operating member 4 to the movable member 3, and is held by the first block 301 of the movable member 3 as described above. As the operating member 4 moves, the spring member 7 is deformed (compressed) under the force applied from the operating member 4, thus storing elastic energy in the spring member 7. Then, the spring member 7 releases the energy stored in itself under the force applied from the operating member 4 (i.e., elastic energy) toward the movable member 3, thus transmitting the force applied from the operating member 4 to the movable member 3.

The spring member 7 is formed of a plate material with elasticity, such as a metallic plate of stainless steel (SUS), for example. That is to say, in this embodiment, the spring member 7 is a leaf spring. The spring member 7 has a first end portion 71 and a second end portion 72, which are respectively located at two horizontal ends thereof. That is to say, the first end portion 71 defines a right end portion of the spring member 7, and the second end portion 72 defines a left end portion of the spring member 7. The spring member 7 further has a curved portion 73, which is raised in the thickness direction (i.e., vertical direction) of the spring member 7, between the first end portion 71 and the second end portion 72. In this case, the curved portion 73 is curved so as to be downwardly raised in a front view. The curved portion 73 is suitably curved in an arc shape with a predetermined curvature. Furthermore, in this embodiment, the first end portion 71 and the second portion 72 are subjected to downward curl bending so as to be curved and raised toward both horizontal ends in a front view. This makes the spring member 7 generally Ω shaped in a front view.

As already described for the section "(2.1) Input device," the operating member 4 is held by the stationary member 2 so as to be rotatable around the rotational axis C1 (see FIG. 6) between the first operating position and the second operating position. Pressing the first button 401 allows the operating member 4 to rotate clockwise in a front view. Pressing the second button 402 allows the operating member 4 to rotate counterclockwise in a front view. The operating member 4 further includes a lever body 403, which is rectangular in a plan view, and a pair of cylindrical shafts 43. The first button 401 and the second button 402 protrude upward from the right and left end portions of the upper surface of the lever body 403. The pair of shafts 43 protrudes from both of the front and rear end faces of the lever body 403 at the horizontal center portion of the lever body 403. The operating member 4 is held rotatably with respect to the stationary member 2 so as to be downwardly clamped by the first case 21 with the pair of shafts 43 put on the pair of supporting walls 222 of the second case 22. The forward and backward movements of the pair of shafts 43 are regulated by a pair of bearings provided on the inner surfaces of the first case 21.

In this case, the operating member 4 further includes a first pressing portion 41 and a second pressing portion 42, which are horizontally spaced apart from each other and located on the right-hand side (closer to the first position) and on the left-hand side (closer to the second position), respectively. The first pressing portion 41 and the second pressing portion 42 respectively downwardly protrude from right and left end portions of the lower surface of the lever body 403. The operating member 4 is positioned with respect to the movable member 3 such that the first pressing portion 41 is arranged at a position corresponding to that of the first recess 34 of the first block 301 and the second pressing portion 42 is arranged at a position corresponding to that of the second recess 35 of the first block 301. The operating member 4 is positioned with respect to the spring member 7 such that the first pressing portion 41 and the second pressing portion 42 are respectively arranged on the right- and left-hand sides of the spring member 7.

This allows the spring member 7 to be clamped between the first pressing portion 41 and the second holding portion 32 when the movable member 3 is located at the first position, and also allows the spring member 7 to be clamped between the second pressing portion 42 and the first holding portion 31 when the movable member 3 is located at the second position. Thus, the operating member 4 moves from the first operating position to the second operating position in such a direction that the first pressing portion 41 comes closer toward the second holding portion 32 and that the second pressing portion 42 goes away from the first holding portion 31. In the meantime, the spring member 7 is compressed by the first pressing portion 41 and the second holding portion 32. On the other hand, the operating member 4 moves from the second operating position to the first operating position in such a direction that the second pressing portion 42 comes closer toward the first holding portion 31 and the first pressing portion 41 goes away from the second holding portion 32. In the meantime, the spring member 7 is compressed by the second pressing portion 42 and the first holding portion 31.

Therefore, as the operating member 4 moves, the force applied from the operating member 4 is transmitted to the movable member 3 via the spring member 7, thus causing the movable member 3 to move. As the operating member 4 moves from the first operating position to the second operating position, the movable member 3 moves from the first position to the second position. On the other hand, as the operating member 4 moves from the second operating position to the first operating position, the movable member 3 moves from the second position to the first position. Detailed configurations for the movable member 3 (particularly, the first block 301), the spring member 7, and the operating member 4 will be described later for the section "(2.3) Quick action mechanism."

The power generating unit 6 includes a mover 61 moving in conjunction with the movable member 3, and converts the kinetic energy of the mover 61 into electrical energy. The power generating unit 6 includes not only the mover 61 but also a core 62 and a coil 63 wound around the core 62 (see FIG. 4). In this embodiment, the power generating unit 6 further includes a coil bobbin 64 and a pair of connecting terminals 65 (see FIG. 4).

The coil bobbin 64 is made of a synthetic resin. The coil 63 is implemented as a conductive wire wound around the coil bobbin 64. The core 62 may be made of a magnetic material such as a silicon steel sheet, for example. The core 62 is integrated with the coil bobbin 64 and the coil 63 so as to pass through the coil bobbin 64 in the forward and backward directions. The pair of connecting terminals 65 is formed of a metallic plate with electric conductivity. The pair of connecting terminals 65 are held by the coil bobbin 64 and are electrically connected to both ends of the conductive wire serving as the coil 63. The pair of connecting terminals 65 are electrically connected to the signal processing circuit 11 through the first connection port 214 of the first case 21.

The core 62 is secured to the stationary member 2. In this embodiment, the core 62 is secured to the stationary member 2 by being downwardly pressed by the first case 21 with both of the front and rear ends of the core 62 put on the pair of ribs 223 of the second case 22. The forward and backward movements of the core 62 are regulated by a pair of regulating ribs provided on the inner surface of the first case 21.

The mover 61 includes a first movable piece 611 and a second movable piece 612, which are respectively arranged on the left- and right-hand sides of the core 62. In this embodiment, the first movable piece 611 is divided into a pair of first yokes 611a, 611b in the forward and backward directions. Likewise, the second movable piece 612 is also divided into a pair of second yokes 612a, 612b in the forward and backward directions. Each of the pair of first yokes 611a, 611b and the pair of second yokes 612a, 612b may be made of a magnetic material such as a silicon steel sheet, for example.

The first movable piece 611 is secured on the left-hand side of the second opening 36 on the upper surface of the second block 302. The second movable piece 612 is secured on the right-hand side of the second opening 36 on the upper surface of the second block 302. The first movable piece 611 and the second movable piece 612 may be secured to the second block 302 by a snap-fit structure with a coupling portion protruding from the upper surface of the second block 302, for example.

The first movable piece 611 and the second movable piece 612 are held in this manner by the movable member 3, thus allowing the mover 61 to move in conjunction with the movable member 3. As the movable member 3 moves, the mover 61 also moves relative to the core 62 secured to the stationary member 2. In this case, regarding the relationship between the movable member 3 and the coil 63, the coil 63 moves relatively inside the second opening 36 of the movable member 3, thus avoiding interference between the movable member 3 and the coil 63. As the mover 61 moves, the first movable piece 611 and the second movable piece 612 come into, and go out of, contact with the front and rear end portions of the core 62.

Specifically, when the movable member 3 is located at the first position (i.e., in the state shown in FIGS. 1A and 1B), the first movable piece 611 is in contact with the core 62. In this case, the first yoke 611a is in contact with the front end portion of the core 62, and the first yoke 611b is in contact with the rear end portion of the core 62. In such a state, the core 62 is out of contact with the second movable piece 612. On the other hand, when the movable member 3 is located at the second position (i.e., in the state shown in FIGS. 2A and 2B), the second movable piece 612 is in contact with the core 62. In this case, the second yoke 612a is in contact with the front end portion of the core 62, and the second yoke 612b is in contact with the rear end portion of the core 62. In such a state, the core 62 is out of contact with the first movable piece 611.

Also, the permanent magnets 5 include a first magnet 51 and a second magnet 52. The first magnet 51 is secured to the first movable piece 611, and the second magnet 52 is secured to the second movable piece 612. Each of the first magnet 51 and the second magnet 52 is formed in a rectangular plate shape. The first magnet 51 is secured to the first movable piece 611 so as to be interposed between the pair of first yokes 611a and 611b. Likewise, the second magnet 52 is secured to the second movable piece 612 so as to be interposed between the pair of second yokes 612a and 612b. The first magnet 51 has its magnetic polarity determined so that the front side thereof is N pole and the rear side thereof is S pole. Thus, the first yoke 611a is magnetized to N pole and the first yoke 611b is magnetized to S pole. On the other hand, the second magnet 52 has its magnetic polarity determined so that the front side thereof is S pole and the rear side thereof is N pole. Thus, the second yoke 612a is magnetized to S pole and the second yoke 612b is magnetized to N pole.

The power generating unit 6 with such a configuration allows the coil 63 to generate power by making a magnetic flux, passing through the core 62, change its direction as the mover 61 moves. That is to say, when the movable member 3 is located at the first position, the first movable piece 611 is in contact with the core 62. Thus, the first yoke 611a, the core 62, and the first yoke 611b together form a magnetic path for passing the magnetic flux generated by the first magnet 51. This makes the direction of the magnetic flux passing through the core 62 backward (i.e., the direction pointing from the front end portion toward the rear end portion). On the other hand, as the movable member 3 moves from the first position to the second position, the mover 61 also moves along with the movable member 3. When the movable member 3 is located at the second position, the second movable piece 612 is in contact with the core 62. Thus, the second yoke 612b, the core 62, and second yoke 612a together form a magnetic path for passing the magnetic flux generated by the second magnet 52. This makes the direction of the magnetic flux passing through the core 62 forward (i.e., the direction pointing from the rear end portion toward the front end portion). In short, as the movable member 3 moves, the magnetic field in the coil 63 changes, thus allowing an induced current to flow through the coil 63. Thus, this power generating unit 6 generates electricity by electromagnetic induction.

In addition, according to this embodiment, the permanent magnets 5 have not only the capability of changing the direction of the magnetic flux passing through the core 62 as described above but also the capability of producing magnetic attraction of holding the movable member 3 at each of the first and second positions. Specifically, when the movable member 3 is located at the first position, the first movable piece 611 is in contact with the core 62, and therefore, the magnetic flux produced by the first magnet 51 attracts the first movable piece 611 toward the core 62, thus holding the movable member 3 at the first position. On the other hand, when the movable member 3 is located at the second position, the second movable piece 612 is in contact with the core 62, and therefore, the magnetic flux produced by the second magnet 52 attracts the second movable piece 612 toward the core 62, thus holding the movable member 3 at the second position. In this manner, the permanent magnets 5 allowing the power generating unit 6 to generate electricity may also be used as the permanent magnets 5 for holding the movable member 3 at each of the first and second positions.

In addition, according to this embodiment, the power generator 1 further includes the ground conductor 113, which is formed of a metallic plate with electrical conductivity. The ground conductor 113 is arranged to surround the first block 301 along the inner surfaces of the first case 21 so as to avoid interference with the movable member 3 in the space between the first case 21 and the second case 22. The ground conductor 113 is electrically connected to a circuit ground (reference potential point) of the signal processing circuit 11 through the second connection ports 215 of the first case 21.

(2.3) Quick Action Mechanism

Figure 6:
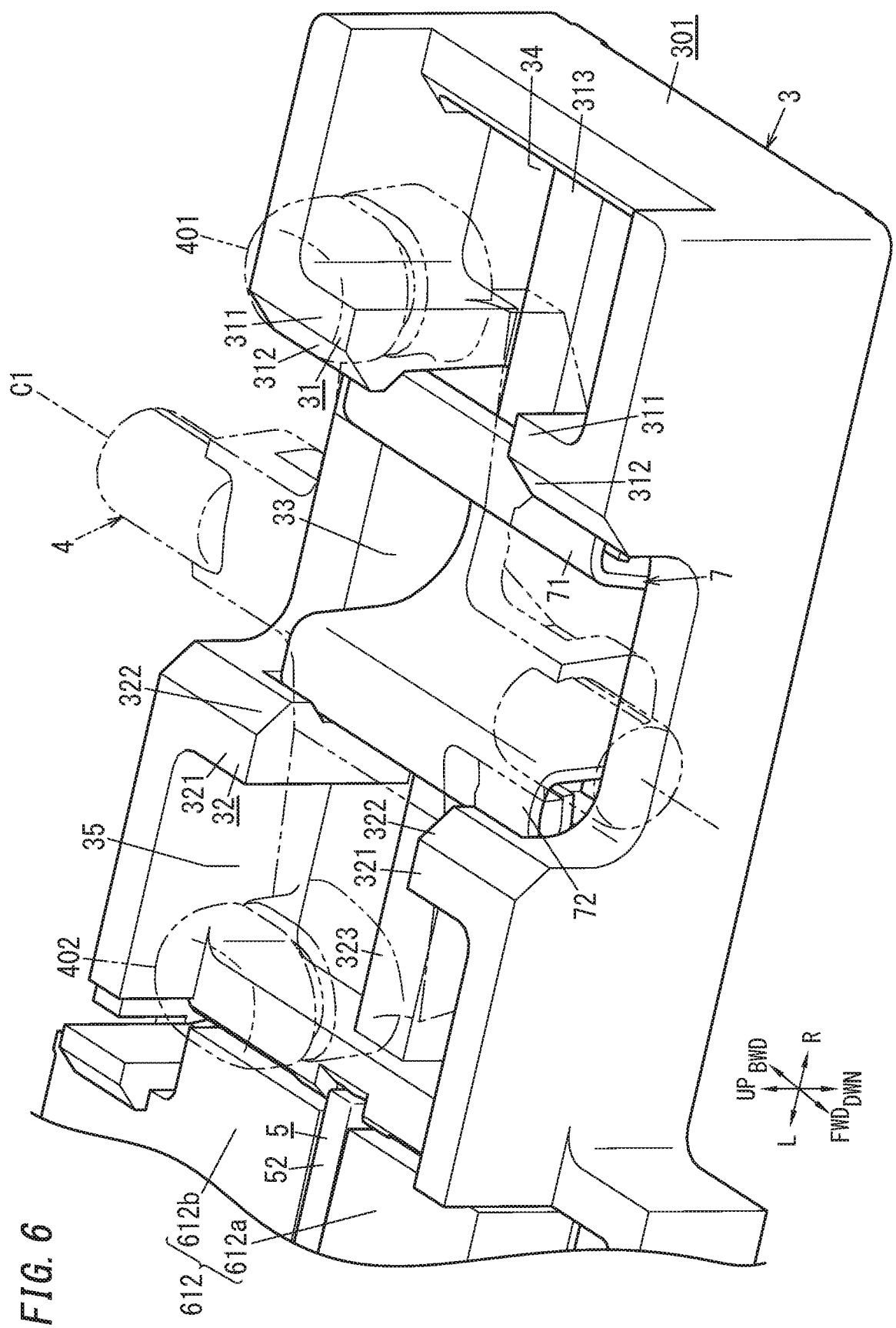
FIG. 6 is a perspective view of the principal part of the power generator, illustrating the movable member, operating member, and spring member thereof.

Next, a detailed configuration for the movable member 3 (particularly the first block 301), the spring member 7, and the operating member 4 will be described with reference to FIGS. 5A, 5B, and 6. In FIG. 6, the operating member 4 is drawn in phantom (two-dot chain). In addition, in FIG. 6, the one-dot chain indicates the rotational axis C1 of the operating member 4, which is illustrated only for the sake of description and is actually insubstantial.

The movable member 3 holds the spring member 7 with the first holding portion 31 and second holding portion 32, which are arranged to horizontally face each other with the first opening 33 interposed between them, as shown in FIGS. 5A and 5B. In this case, (the first block 301 of) the movable member 3 is configured to hold the spring member 7 by contacting with the four corners of the spring member 7 in a plan view. Specifically, the first holding portion 31 includes a pair of first holding pieces 311, which are spaced apart from each other in the width direction that is perpendicular to the horizontal direction, and makes the pair of first holding pieces 311 come into contact with the first end portion 71 of the spring member 7 from the right. Likewise, the second holding portion 32 includes a pair of second holding pieces 321, which are spaced apart from each other in the width direction, and makes the pair of second holding pieces 321 come into contact with the second end portion 72 of the spring member 7 from the left. As used herein, the "width direction" is the direction perpendicular to both the predetermined direction (horizontal direction) and the operating direction (vertical direction), and corresponds to the forward and backward directions in this embodiment.

The first holding portion 31 further includes a pair of first projections 312, which projects leftward from the top of the left side surface of the pair of first holding pieces 311, i.e., the surface facing the second holding portion 32. The pair of first projections 312 has a generally triangular shape in a front view and comes into contact with the first end portion 71 of the spring member 7 from over the spring member 7. Likewise, the second holding portion 32 further includes a pair of second projections 322, which projects rightward from the top of the right side surface of the pair of second holding pieces 321, i.e., the surface facing the first holding portion 31. The pair of second projections 322 has a generally triangular shape in a front view and comes into contact with the second end portion 72 of the spring member 7 from over the spring member 7.

The first holding portion 31 further includes, between the pair of first holding pieces 311, a first supporting stage 313, which protrudes upward from the bottom of the first recess 34. The first supporting stage 313 is spaced apart from the pair of first holding pieces 311 in the forward and backward directions, and comes into contact with the first end portion 71 of the spring member 7 from under the first end portion 71. Likewise, the second holding portion 32 further includes, between the pair of second holding pieces 321, a second supporting stage 323, which protrudes upward from the bottom of the second recess 35. The second supporting stage 323 is spaced apart from the pair of second holding pieces 321 in the forward and backward directions, and comes into contact with the second end portion 72 of the spring member 7 from under the second end portion 72.

According to the configuration described above, the first holding portion 31 comes into contact with the first end portion 71 of the spring member 7 from the right of, from over, and from under, the first end portion 71, thus regulating the rightward, upward, and downward movements of the first end portion 71. Likewise, the second holding portion 32 comes into contact with the second end portion 72 of the spring member 7 from the left of, from over, and from under, the second end portion 72, thus regulating the leftward, upward, and downward movements of the second end portion 72. Among other things, the rightward and leftward movements of the spring member 7 are regulated by bringing the pair of first holding pieces 311 and the pair of second holding pieces 321 into contact with the four corners of the spring member 7 in a plan view.

In this case, the spring member 7 is firmly held by the movable member 3 so as not to drop accidentally by having the first end portion 71 thereof sandwiched between the pair of first projections 312 and the first supporting stage 313 and by having the second end portion 72 thereof sandwiched between the pair of second projections 322 and the second supporting stage 323. That is why the overlap allowance of the spring member 7 (i.e., the maximum insertion depth of the first end portion 71 into the gap between the pair of first projections 312 and the first supporting stage 313 and the maximum insertion depth of the second end portion 72 into the gap between the pair of second projections 322 and the second supporting stage 323) is suitably set within the range from about 0.5 mm to about 1.0 mm.

Furthermore, the dimension of the lever body 403 of the operating member 4 as measured in the forward and backward directions is set at a value smaller than that of the gap between the pair of first holding pieces 311 and that of the gap between the pair of second holding pieces 321. This allows the first pressing portion 41 to be located between the pair of first holding pieces 311 in the forward and backward directions, and also allows the second pressing portion 42 to be located between the pair of second holding pieces 321 in the forward and backward directions.

This arrangement allows the operating member 4 to come into contact, at the first pressing portion 41, with the first end portion 71 of the spring member 7 from the right through the gap between the pair of first holding pieces 311 as shown in FIG. 6. Likewise, this arrangement also allows the operating member 4 to come into contact, at the second pressing portion 42, with the second end portion 72 of the spring member 7 from the left through the gap between the pair of second holding pieces 321. That is to say, the operating member 4 comes into contact, at the first pressing portion 41, with a center portion of the first end portion 71 of the spring member 7 in the forward and backward directions, and also comes into contact, at the second pressing portion 42, with a center portion of the second end portion 72 of the spring member 7 in the forward and backward directions, thereby compressing the spring member 7. In other words, the operating member 4 compresses the spring member 7 by coming into contact with the respective center portions of the spring member 7 in the forward and backward directions. Note that to avoid interference with the first supporting stage 313 and the second supporting stage 323, the respective lower surfaces of the first pressing portion 41 and the second pressing portion 42 are suitably notched.

The first pressing portion 41 further includes a first sloped surface 411, which is sloped with respect to the vertical direction, at such a position as to horizontally face the second holding portion 32 such that as the first pressing portion 41 moves vertically, the horizontal distance to the second holding portion 32 changes. In other words, the left end surface of the first pressing portion 41 to come into contact with the first end portion 71 of the spring member 7 is the first sloped surface 411, of which the slope faces diagonally downward to the left. The second pressing portion 42 further includes a second sloped surface 421, which is sloped with respect to the vertical direction, at such a position as to horizontally face the first holding portion 31 such that as the second pressing portion 42 moves vertically, the horizontal distance to the first holding portion 31 changes. In other words, the right end surface of the second pressing portion 42 to come into contact with the second end portion 72 of the spring member 7 is the second sloped surface 421, of which the slope faces diagonally downward to the right. In this embodiment, each of the first and second pressing portions 41 and 42 has a generally triangular shape in a front view.

According to the configuration described above, moving the first pressing portion 41 downward while the operating member 4 is moving from the first operating position toward the second operating position allows the first sloped surface 411 to narrow the horizontal gap between the first pressing portion 41 and the second holding portion 32. That is to say, this brings the first pressing portion 41 closer to the second holding portion 32. Thus, the downward force is converted by the first sloped surface 411 into leftward force, thus compressing the spring member 7. On the other hand, moving the second pressing portion 42 upward while the operating member 4 is moving from the first operating position toward the second operating position allows the second sloped surface 421 to widen the horizontal gap between the second pressing portion 42 and the first holding portion 31. That is to say, this brings the second pressing portion 42 away from the first holding portion 31. Thus, when the spring member 7 is compressed, the second pressing portion 42 is out of contact with the second end portion 72 of the spring member 7. This reduces the chances of the second pressing portion 42 interfering with the movement of the second end portion 72 of the spring member 7 when the elastic energy of the spring member 7 is released.

Likewise, moving the second pressing portion 42 downward while the operating member 4 is moving from the second operating position toward the first operating position allows the second sloped surface 421 to narrow the horizontal gap between the second pressing portion 42 and the first holding portion 31. That is to say, this brings the second pressing portion 42 closer to the first holding portion 31. Thus, the downward force is converted by the second sloped surface 421 into rightward force, thus compressing the spring member 7. On the other hand, moving the first pressing portion 41 upward while the operating member 4 is moving from the second operating position toward the first operating position allows the first sloped surface 411 to widen the horizontal gap between the first pressing portion 41 and the second holding portion 32. Thus, when the spring member 7 is compressed, the first pressing portion 41 is out of contact with the first end portion 71 of the spring member 7. This reduces the chances of the first pressing portion 41 interfering with the movement of the first end portion 71 of the spring member 7 when the elastic energy of the spring member 7 is released.

As can be seen, the first sloped surface 411 and the second sloped surface 421 not only compress the spring member 7 by changing the direction of the force applied to the operating member 4 but also serve as a sort of "relief" for avoiding collision between the spring member 7 and the operating member 4 when the elastic energy of the spring member 7 is released.

The first holding portion 31, the second holding portion 32, the spring member 7, and the operating member 4 that form the quick action mechanism are suitably symmetric with respect to a plane. In this case, the reference plane of the plane symmetry is a plane including the rotational axis C1 of the operating member 4 and perpendicular to the horizontal direction.

(2.4) Operation

Next, it will be described with reference to FIGS. 7A-8C how the power generator 1 and input device 10 according to this embodiment operate. The following description will be focused on the operations of the movable member 3 (particularly that of the first block 301), the spring member 7, and the operating member 4. Thus, only a part of the cross section shown in FIG. 1B and taken along the plane X1-X1 shown in FIG. 1A is illustrated on a larger scale in FIGS. 7A-8C. Also, in FIGS. 7A-8C, the directions of the forces applied are indicated by the arrows F1-F4. Note that these arrows are just shown for the purpose of description and are insubstantial. In addition, the rotational axis C1 of the operating member 4 is shown in FIGS. 7A-8C just for the purpose of description and is insubstantial as well.

First of all, it will be described with reference to FIGS. 7A-7C how the power generator 1 operates when the movement of the operating member 4 from the first operating position to the second operating position makes the movable member 3 move from the first position to the second position.

Figure 7A:
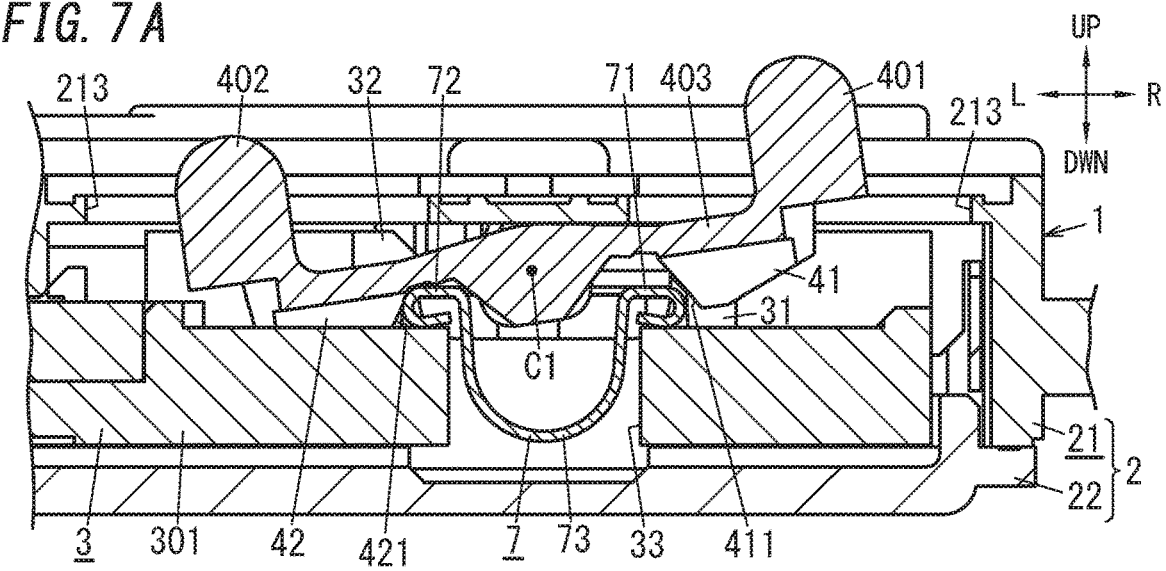
FIGS. 7A-7C illustrate how the power generator operates while the movable member thereof is moving from the first position to the second position.

While the operating member 4 is not operated yet with the movable member 3 located at the first position (i.e., while no force is applied yet to the operating member 4 from outside of the power generator 1), the operating member 4 is located at the first operating position as shown in FIG. 7A. In such a state, the spring member 7 is horizontally interposed between the first pressing portion 41 and the second holding portion 32. The first pressing portion 41 faces the first end portion 71 of the spring member 7, and the second holding portion 32 faces the second end portion 72 of the spring member 7. However, some gap may be left between the first end portion 71 and the first pressing portion 41 and/or between the second end portion 72 and the second holding portion 32.

Figure 7B:
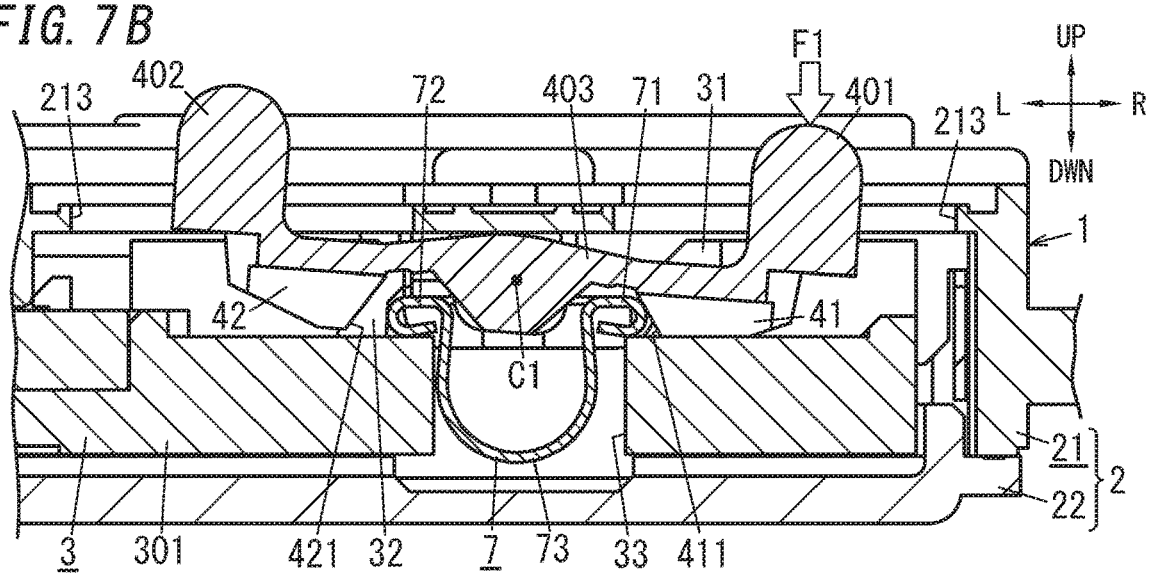

Applying downward force F1 to the first button 401 (i.e., pressing the first button 401) in such a state makes the operating member 4 rotate clockwise in a front view around the rotational axis C1 as shown in FIG. 7B. That is to say, the first pressing portion 41 moves downward, thus allowing the first sloped surface 411 to convert the downward force into leftward force and displace the first end portion 71 of the spring member 7 to the left. At this point in time, the movable member 3 is held at the first position under the magnetic attraction generated by one of the permanent magnets 5 (the first magnet 51 in this case), and therefore, the second holding portion 32 does not move. Therefore, in the horizontal direction, the first pressing portion 41 comes closer toward the second holding portion 32, thus narrowing the gap between the first end portion 71 and the second end portion 72 of the spring member 7 and deforming the curved portion 73 into a shape with a smaller radius of curvature.

This compresses the spring member 7 and thereby allows the spring member 7 to store elastic energy and generate restoring force.

Figure 7C:
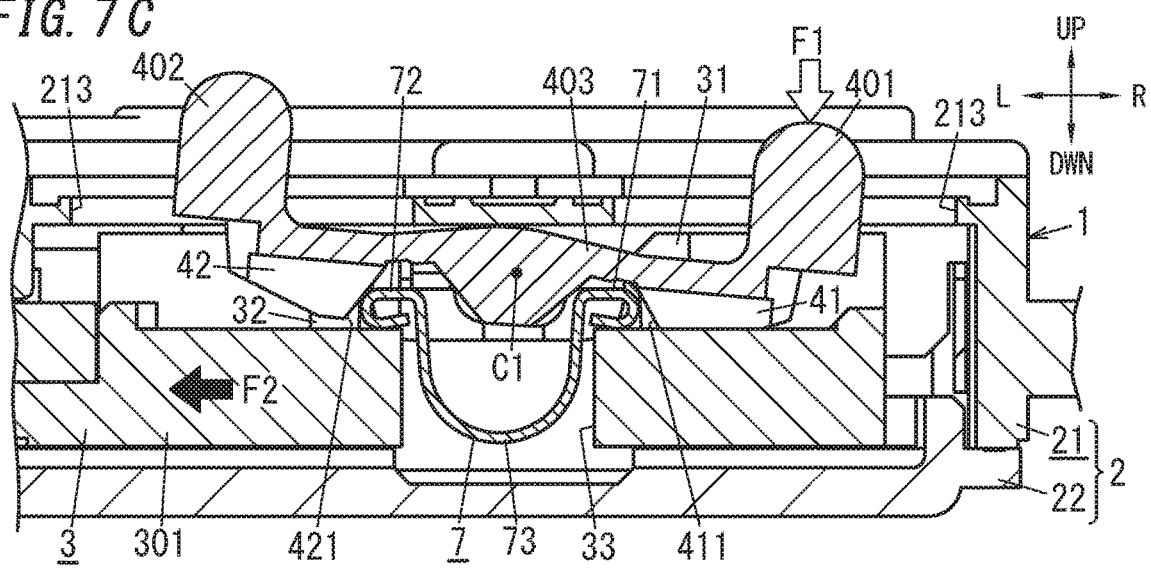

Applying the downward force F1 continuously to the first button 401 in such a state makes the operating member 4 further rotate clockwise in a front view around the rotational axis C1 as shown in FIG. 7C. In this case, the first pressing portion 41 moves further downward, thus allowing the first sloped surface 411 to convert the downward force into leftward force and further displace the first end portion 71 of the spring member 7 to the left. As the degree of displacement of the first end portion 71 increases, the magnitude of deformation of the spring member 7 also increases, thus gradually increasing the elastic energy stored in the spring member 7. When the restoring force of the spring member 7 exceeds the magnetic attraction of one the permanent magnets 5 (i.e., the first magnet 51 in this case), the permanent magnet 5 releases its hold on the movable member 3, releasing the elastic energy of the spring member 7. In this case, the second end portion 72 of the spring member 7 pushes the second holding portion 32, and the restoring force F2 of the spring member 7 causes the movable member 3 to move to the left with impetus. This allows the movable member 3 to move relatively quickly to the second position, defining the terminal position of the movable range (i.e., the position indicated in FIG. 2B). The movement of the movable member 3 from the first position to the second position converts the kinetic energy of the mover 61 held by the movable member 3 into electrical energy, making the power generating unit 6 generate electricity.

Next, it will be described with reference to FIGS. 8A-8C how the power generator 1 operates when the movement of the operating member 4 from the second operating position to the first operating position makes the movable member 3 move from the second position to the first position.

While the operating member 4 is not operated yet with the movable member 3 located at the second position (i.e., while no force is applied yet to the operating member 4 from outside of the power generator 1), the operating member 4 is located at the second operating position as shown in FIG. 8A. In such a state, the spring member 7 is horizontally interposed between the second pressing portion 42 and the first holding portion 31. The second pressing portion 42 faces the second end portion 72 of the spring member 7, and the first holding portion 31 faces the first end portion 71 of the spring member 7. However, some gap may be left between the second end portion 72 and the second pressing portion 42 and/or between the first end portion 71 and the first holding portion 31.

Applying downward force F3 to the second button 402 (i.e., pressing the second button 402) in such a state makes the operating member 4 rotate counterclockwise in a front view around the rotational axis C1 as shown in FIG. 8B. That is to say, the second pressing portion 42 moves downward, thus allowing the second sloped surface 421 to convert the downward force into rightward force and displace the second end portion 72 of the spring member 7 to the right. At this point in time, the movable member 3 is held at the second position under the magnetic attraction generated by one of the permanent magnets 5 (the second magnet 52 in this case), and therefore, the first holding portion 31 does not move. Therefore, in the horizontal direction, the second pressing portion 42 comes closer toward the first holding portion 31, thus narrowing the gap between the first end portion 71 and the second end portion 72 of the spring member 7 and deforming the curved portion 73 into a shape with a smaller radius of curvature. This compresses the spring member 7 and thereby allows the spring member 7 to store elastic energy and generate restoring force.

Applying the downward force F3 continuously to the second button 402 in such a state makes the operating member 4 further rotate counterclockwise in a front view around the rotational axis C1 as shown in FIG. 8C. In this case, the second pressing portion 42 moves further downward, thus allowing the second sloped surface 421 to convert the downward force into rightward force and further displace the second end portion 72 of the spring member 7 to the right. As the degree of displacement of the second end portion 72 increases, the magnitude of deformation of the spring member 7 also increases, thus gradually increasing the elastic energy stored in the spring member 7. When the restoring force of the spring member 7 exceeds the magnetic attraction of one of the permanent magnets 5 (i.e., the second magnet 52 in this case), the permanent magnet 5 releases its hold on the movable member 3, thus releasing the elastic energy of the spring member 7. In this case, the first end portion 71 of the spring member 7 pushes the first holding portion 31, and the restoring force F4 of the spring member 7 causes the movable member 3 to move to the right with impetus. This allows the movable member 3 to move relatively quickly to the first position, defining the terminal position of the movable range (i.e., the position indicated in FIG. 1B). The movement of the movable member 3 from the second position to the first position converts the kinetic energy of the mover 61 held by the movable member 3 into electrical energy, making the power generating unit 6 generate electricity.

In this case, the exact degree of narrowing of the gap between the first and second end portions 71 and 72 of the spring member 7 that allows the permanent magnet 5 to release its hold on the movable member 3 may be set arbitrarily by, for example, the spring modulus of the spring member 7, the magnitude of the magnetic attraction of the permanent magnet 5, and other factors. For example, if the overlap allowance of the spring member 7 is in the range from about 0.5 mm to about 1.0 mm as described above, settings may be made such that when the gap between the first and second end portions 71 and 72 is narrowed by about 0.3 mm, for example, the restoring force of the spring member 7 exceeds the magnetic attraction of the permanent magnet 5.

As can be seen from the foregoing description, in the power generator 1 and input device 10 according to this embodiment, operating (or moving) the operating member 4 makes the movable member 3 move from the first position to the second position, or vice versa. That is to say, the movable member 3 horizontally reciprocates linearly between the first position and the second position. In addition, no matter whether the movable member 3 moves from the first position to the second position or from the second position to the first position, the restoring force of the spring member 7 allows the movable member 3 to move relatively quickly. This enables the power generating unit 6 to generate electricity in the same way both on an "outward path" on which the movable member 3 moves from the first position to the second position and on a "homeward path" on which the movable member 3 moves from the second position back to the first position.

(3) Advantages

The power generator 1 according to the embodiment described above uses the restoring force of the same spring member 7 to move the movable member 3 from the first position to the second position, and vice versa. That is to say, no matter whether the movable member 3 is moved from the first position to the second position or from the second position to the first position, the restoring force of the spring member 7 makes the movable member 3 move relatively quickly, thus allowing the power generating unit 6 to generate electricity with good stability. This allows the spring member 7 to be implemented as a single member while generating a relatively stable amount of electricity in a situation where the movable member 3 moves bidirectionally between the first position and the second position. This reduces the number of parts that form the spring member 7, thus simplifying the structure, and reducing the overall size, of the power generator 1.

In addition, using the restoring force of the same spring member 7 to move the movable member 3 from the first position to the second position, and vice versa, also reduces the variation in the amount of electricity generated by the power generating unit 6 when the movable member 3 moves bidirectionally. In other words, this makes the operation when the movable member 3 moves from the first position to the second position generally symmetric to the operation when the movable member 3 moves from the second position to the first position. This makes the moving velocity and stroke of the movable member 3 substantially uniform, no matter whether the movable member 3 moves from the first position to the second position or from the second position to the first position, thus reducing the variation in the amount of electricity generated by the power generating unit 6.

Also, as in the embodiment described above, the spring member 7 is suitably a leaf spring having the first end portion 71 and the second end portion 72 at both ends thereof in the predetermined direction (horizontal direction), and the spring member 7 suitably further includes the curved portion 73, of which curvature makes the spring member 7 raised in its thickness direction, and which is located between the first end portion 71 and the second end portion 72. According to this configuration, a leaf spring having a symmetric shape in the predetermined direction that is the movement direction of the movable member 3 may be adopted as the spring member 7. This reduces the variation in the restoring force of the spring member 7 between when the movable member 3 moves from the first position to the second position and when the movable member 3 moves from the second position to the first position. Note that this configuration is not essential to the power generator 1. Alternatively, the spring member 7 may have a portion bent at a predetermined angle instead of the curved portion 73.

Also, as in embodiment described above, the first holding portion 31 suitably includes the pair of first holding pieces 311 spaced apart from each other in the width direction (forward and backward directions) perpendicular to the predetermined direction (horizontal direction). The first holding portion 31 is suitably configured to come into contact with the spring member 7 at the pair of first holding pieces 311. In that case, the second holding portion 32 suitably includes the pair of second holding pieces 321 spaced apart from each other in the width direction, and the second holding portion 32 is suitably configured to come into contact with the spring member 7 at the pair of second holding pieces 321. Also, in that case, the first pressing portion 41 is suitably located between the pair of first holding pieces 311 in the width direction, and the second pressing portion 42 is suitably located between the pair of second holding pieces 321 in the width direction. This configuration allows the operating member 4 to press the spring member 7 at the first pressing portion 41 in the gap between the pair of first holding pieces 311, and also allows the operating member 4 to press the spring member 7 at the second pressing portion 42 in the gap between the pair of second holding pieces 321. Thus, while the first pressing portion 41 or the second pressing portion 42 is compressing the spring member 7, the spring member 7 may be pressed straight in the predetermined direction without tilting easily in the width direction. This facilitates stabilizing the restoring force produced by the spring member 7. Note that this configuration is not essential to the power generator 1. Alternatively, the first pressing portion 41 or the second pressing portion 42 may be configured to press only an associated one end portion of the spring member 7 in the width direction.

Also, as in the embodiment described above, the movable member 3 is suitably held by the stationary member 2 so as to be movable linearly in the predetermined direction (horizontal direction). According to this configuration, the movable member 3 moves linearly, thus allowing for minimizing the dimensions of the power generator 1 in directions other than the predetermined direction. For example, when the input device 10 is used as a crescent sensor as in this embodiment, the power generator 1 may be implemented to have an elongated shape, of which the width is narrow enough not to exceed the width of a window frame that is an object of attachment. Note that this configuration is not essential to the power generator 1. Alternatively, the movable member 3 may also be configured to move while rotating, such as a seesaw structure.

Furthermore, as in the embodiment described above, the operating member 4 is suitably held by the stationary member 2 so as to be rotatable between the first operating position and the second operating position. In that case, the operating member 4 is suitably configured to move from the first operating position to the second operating position in such a direction that the first pressing portion 41 comes closer toward the second holding portion 32 and that the second pressing portion 42 goes away from the first holding portion 31. Also, in that case, the operating member 4 is suitably configured to move from the second operating position to the first operating position in such a direction that the second pressing portion 42 comes closer toward the first holding portion 31 and that the first pressing portion 41 goes away from the second holding portion 32. This configuration allows the operating member 4 to seesaw between the first operating position and the second operating position. Therefore, as the first pressing portion 41 moves downward, the second pressing portion 42 moved upward, for example. This allows one of the first and second pressing portions 41, 42, which is not used to press the spring member 7, to retreat from the traveling path of the movable member 3, thus reducing the chances of the first pressing portion 41 or the second pressing portion 42 interfering with the movement of the movable member 3. This curbs a decline in the amount of electricity generated by the power generating unit 6 due to the interference with the movement of the movable member 3. Note that this configuration is not essential to the power generator 1, and the operating member 4 does not have to have such a seesaw structure.

In this case, as in the embodiment described above, the operating member 4 is suitably configured to be movable with respect to the stationary member 2 so as to move the first pressing portion 41 and the second pressing portion 42 in the operating direction (vertical direction) intersecting with the predetermined direction (horizontal direction). In that case, the first pressing portion 41 suitably has the first sloped surface 411, which is sloped with respect to the operating direction and located at such a position as to face the second holding portion 32 in the predetermined direction such that as the first pressing portion 41 moves in the operating direction, distance to the second holding portion 32 changes in the predetermined direction. The second pressing portion 42 suitably has the second sloped surface 421, which is sloped with respect to the operating direction and located at such a position as to face the first holding portion 31 in the predetermined direction such that as the second pressing portion 42 moves in the operating direction, distance to the first holding portion 31 changes in the predetermined direction. According to this configuration, the first sloped surface 411 and the second sloped surface 421 not only compress the spring member 7 by changing the direction of the force applied to the operating member 4 but also serve as a sort of "relief" for avoiding collision between the spring member 7 and the operating member 4 when the elastic energy of the spring member 7 is released. This further curbs the decline in the amount of electricity generated by the power generating unit 6 due to the interference with the movement of the movable member 3. Note that this configuration is not essential to the power generator 1. Alternatively, the first and second pressing portions 41 and 42 may have no sloped surfaces, and instead, the surfaces of the spring member 7 to contact with the first and second pressing portions 41 and 42 may be sloped.

Furthermore, as in the embodiment described above, the power generating unit 6 suitably further includes the core 62 and the coil 63 wound around the core 62. In that case, the power generating unit 6 is suitably configured to generate power from the coil 63 by causing a direction of magnetic flux passing through the core 62 to change as the mover 61 moves. This configuration allows the permanent magnet 5 that is used to generate magnetic attraction to hold the movable member 3 at each of the first and second positions to be also used for helping the power generating unit 6 generate electricity. Note that this configuration is not essential to the power generator 1. Alternatively, the power generating unit 6 may also be configured to convert kinetic energy into electrical energy using a piezoelectric element or a magnetostrictive element, for example, instead of electromagnetic induction. Furthermore, another permanent magnet for helping the power generating unit 6 generate electricity may also be provided separately from the permanent magnet 5 that generates magnetic attraction.

In this case, as in the embodiment described above, the mover 61 suitably includes the first movable piece 611 and the second movable piece 612, which are located on both sides of the core 62 in the predetermined direction (horizontal direction). The first movable piece 611 is configured to be in contact with the core 62 when the movable member 3 is located at the first position. The second movable piece 612 is configured to be in contact with the core 62 when the movable member 3 is located at the second position. In that case, the permanent magnet 5 suitably includes the first magnet 51 secured to the first movable piece 611 and the second magnet 52 secured to the second movable piece 612. This allows a relatively simple configuration, in which the core 62 simply moves relatively between the first movable piece 611 and the second movable piece 612, to generate electricity with the direction of a magnetic flux passing through the core 62 changed. Note that this configuration is not essential to the power generator 1. Alternatively, the power generating unit 6 may also be configured to change the direction of the magnetic flux passing through the core 62 by using only a single magnet as the permanent magnet 5.

Furthermore, as in the embodiment described above, the input device 10 suitably includes the power generator 1, and the signal processing circuit 11 electrically connected to the power generating unit 6, and configured to output a signal by using the electrical energy generated by the power generating unit 6 in response to operation of the operating member 4. This configuration allows for simplifying the structure, and reducing the overall size, of the input device 10. Moreover, this input device 10 also allows a battery for driving the signal processing circuit 11 to either have a reduced capacity or be even omitted.

(4) Variations

The following are some variations of the exemplary embodiment described above:

The operating member 4 only needs to have a first pressing portion 41 and a second pressing portion 42 that are spaced apart from each other in the predetermined direction. The first pressing portion 41 and the second pressing portion 42 do not have to be integrated together but may be provided separately from each other. That is to say, the first pressing portion 41 and the second pressing portion 42 may form integral parts of a single member or may form respective portions of two different members and may move independently of each other.

Also, the input device 10 does not have to be configured to detect the position of a machine part (e.g., a crescent lock of the crescent sensor described above) but may also be a switch to be turned by a human to operate a device, for example. In that case, the power generator 1 may be configured such that its operating member 4 is either directly operated by a human user or indirectly operated by him or her via an operating handle or any other member.

Furthermore, the input device 10 may include a switch, provided separately from the power generating unit 6, for transmitting detection information to the signal processing circuit 11. In that case, the signal processing circuit 11 uses, as its power supply, the power generated by the power generating unit 6 and generates a detection signal in response to a turn ON/OFF of the switch. Then, the switch may turn ON or OFF in conjunction with the operation of the operating member 4. Alternatively, an operating unit for turning the switch may be provided separately from the operating member 4 of the power generator 1.

Furthermore, the method of communication between the signal processing circuit 11 and the receiver does not have to be wireless communication using a radio wave as a transmission medium, but may also be optical wireless communication using some type of light such as an infrared ray as a medium or even wired communication as well.

The power generator 1 only needs to use the same restoring force produced by the spring member 7 to move the movable member 3 from the first position to the second position and vice versa, and the spring member 7 does not have to be implemented as a single member for the power generator 1. Alternatively, a plurality of spring members 7 may be arranged either in series or in parallel between the operating member 4 and the movable member 3. Even so, the restoring force of the same set of spring members 7 may be used to move the movable member 3 from the first position to the second position and vice versa.

The spring member 7 does not have to have the configuration described for the exemplary embodiment. For example, the first end portion 71 and the second end portion 72 do not have to be subjected to the curl bending. Furthermore, the spring member 7 does not have to be a leaf spring in the first place, but may also be a compression coil spring or a torsion spring, for example.

Furthermore, the power generating unit 6 may also be modified such that the core 62 and the coil 63 are provided for the mover 61 and the permanent magnets 5 are provided for a stator (i.e., a member to be secured to the stationary member 2). Even such an alternative configuration also allows the permanent magnets 5 to move relative to the core 62, and therefore, allows the direction of a magnetic flux passing through the core 62 to be changed by moving the mover 61.

Moreover, the operating member 4 does not have to be configured to be exposed through the upper surface of the stationary member 2 but may also be exposed through a side surface or a lower surface of the stationary member 2. In a situation where the operating member 4 is provided for a side surface of the stationary member 2, the operating member 4 may move linearly in the predetermined direction between a first operating position and a second operating position. That is to say, the operating member 4 does not have to have such a seesaw structure but may also have a press button structure that moves linearly or a slide structure.

Also, the mover 61 of the power generating unit 6 only needs to move in conjunction with the movable member 3 and does not have to be secured to the movable member 3. For example, the mover 61 may form part of the movable member 3 or be just connected to the movable member 3 via a link.

Optionally, the power generator 1 may also be configured to have the power generating unit 6 generate electricity either only while the movable member 3 is moving from the first position to the second position or only while the movable member 3 is moving from the second position to the first position.

Even though the operating member 4 has two buttons (namely, the first button 401 and the second button 402) in the embodiment described above, the operating member 4 may have three or more buttons or only one button as well.

The power generator 1 does not have to form part of the input device 10. Alternatively, the power generator 1 may also be used by itself or may even be built in any appliance or facility other than the input device 10.

Furthermore, in the input device 10, the signal processing circuit 11 does not have to be entirely housed in the upper cover 23 as in the embodiment described above. Instead, part or all of the signal processing circuit 11 may be provided outside of the upper cover 23. The signal processing circuit 11 includes electronic components that form part of a power supply circuit, a control circuit, a memory, a communication circuit, or any other circuit or circuit component. However, this is only an example and should not be construed as limiting. The signal processing circuit 11 may also include, as alternative or additional components for at least some of these, electronic components that form part of, for example, a sensor, an A/D converter, a D/A converter, a receiver circuit or any other circuit or circuit component as well.

(First Variation)

Next, a lock device 8A with sensor will be described as a first variation with reference to FIGS. 9A-10B. In the following description, the respective directions are defined just as indicated by the "up," "down," "right," and "left" arrows in FIGS. 9A-10B as in the embodiment described above. However, these directions are only an example and should not be construed as limiting the directions in which the lock device 8A with sensor is used.

A lock device 8A with sensor according to a first variation includes the input device 10 according to the embodiment described above, a crescent lock 81, and a link mechanism 82A. The link mechanism 82A is configured to interlock the operating member 4 of the input device 10 with the crescent lock 81. The link mechanism 82A is configured to move the operating member 4 in such a direction that the first pressing portion 41 (see FIG. 1B) comes closer to the second holding portion 32 (see FIG. 1B) while the crescent lock 81 is switching from one of a locked state (see FIG. 9A) or an unlocked state (see FIG. 10A) to the other. This allows the operating member 4 to be indirectly operated by the crescent lock 81, and also allows the operating member 4 to change its operating state depending on whether the crescent lock 81 is locked or unlocked. That is to say, in this lock device 8A with sensor, the input device 10 for use as a crescent sensor for detecting locking or unlocking of the crescent lock 81 is integrated with the crescent lock 81.

The lock device 8A with the sensor is mounted onto a window frame, which is an object of attachment, instead of a general crescent lock without the input device 10. This allows a receiver, receiving detection information from the lock device 8A with sensor (the input device 10), to monitor the state of the crescent lock 81 and determine whether the crescent lock 81 is locked or unlocked.

The lock device 8A with sensor further includes a housing 83 for housing the input device 10 and the link mechanism 82A. The housing 83 includes, as a fixing structure for fixing the housing 83 onto a window frame or any other member, which is an object of attachment, a fixing member to be fixed onto the object of attachment by screwing, for example. Fixing the housing 83 to the object of attachment with the fixing member allows the lock device 8A with sensor to be mounted onto the object of attachment. The input device 10 is secured to the housing 83 with screws 84. The crescent lock 81 is held by the housing 83 so as to be rotatable on a shaft 811. The link mechanism 82A transmits the force applied from the crescent lock 81 to the link mechanism 82A to the operating member 4 of the input device 10 inside the housing 83, thus interlocking the operating member 4 with the crescent lock 81.

The link mechanism 82A includes a press member 85A. The link mechanism 82A also includes a lever member 86 to be pressed by the press member 85A. The link mechanism 82A further includes a rack gear 821 and a pinion gear 822. The press member 85A is formed integrally with the rack gear 821. The pinion gear 822 is mounted to the shaft 811 of the crescent lock 81. Thus, operating the crescent lock 81 allows the pinion gear 822 and the rack gear 821 to convert the rotational motion of the crescent lock 81 to the linear motion of the press member 85A. In other words, the press member 85A is interlocked with the crescent lock 81 via the rack gear 821 and the pinion gear 822. In the example illustrated in FIGS. 9 and 10, the shaft 811 of the crescent lock 81 has a rotational axis extending vertically. Turning the crescent lock 81 on the shaft 811 makes the press member 85A move horizontally synchronously with the rotation of the crescent lock 81.

The press member 85A is a member for pressing the first button 401 and the second button 402 of the operating member 4 via the lever member 86. The press member 85A is arranged to face a portion, having the pair of through holes 213, of the upper surface of the first case 21 (see FIG. 3). In this first variation, while the state of the crescent lock 81 is switching from the locked state (see FIG. 9A) to the unlocked state (see FIG. 10A), as the crescent lock 81 turns, the press member 85A moves linearly to the right. During this movement, the press member's 85A pressing the first button 401 via the lever member 86 makes the operating member 4 rotate from the first operating position to the second operating position. This displaces the first pressing portion 41 toward the second holding portion 32, and allows the movable member 3 to move from the first position to the second position under the restoring force of the spring member 7 (see FIGS. 7A-7C). On the other hand, while the state of the crescent lock 81 is switching from the unlocked state (see FIG. 10A) to the locked state (see FIG. 9A), as the crescent lock 81 turns, the press member 85A moves linearly to the left. In this case, the press member's 85A pressing the second button 402 via the lever member 86 makes the operating member 4 rotate from the second operating position to the first operating position. This displaces the second pressing portion 42 toward the first holding portion 31, and allows the movable member 3 to move from the second position to the first position under the restoring force of the spring member 7 (see FIGS. 8A-8C).

Figure 9A:
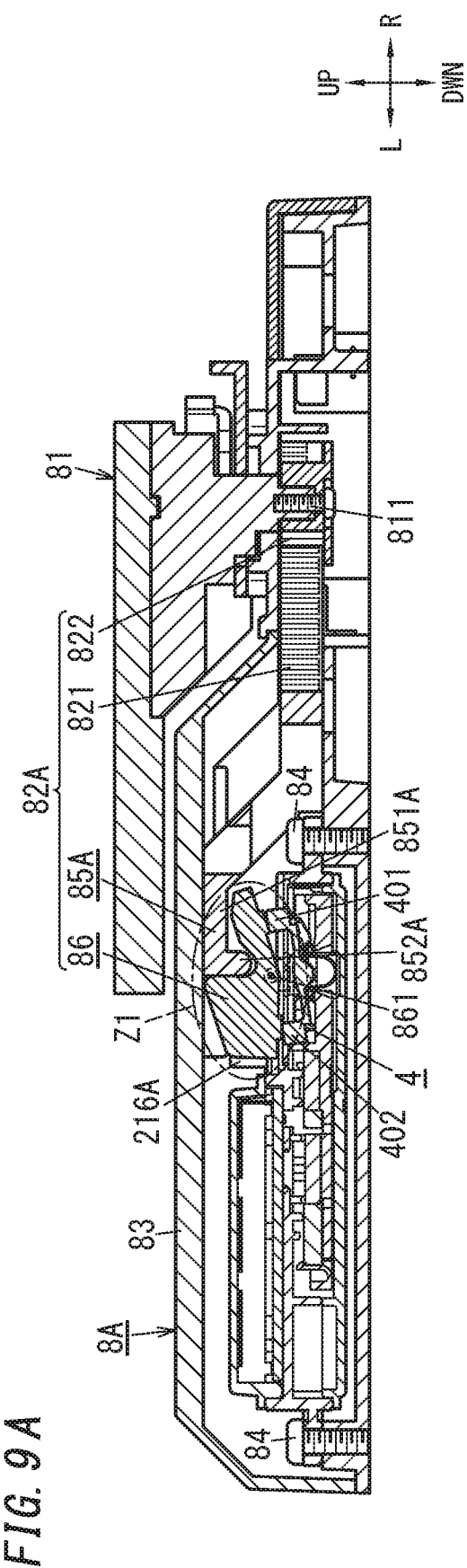
FIG. 9A is a cross-sectional view illustrating a locked state of a lock device with sensor according to a first variation.
Figure 9B:
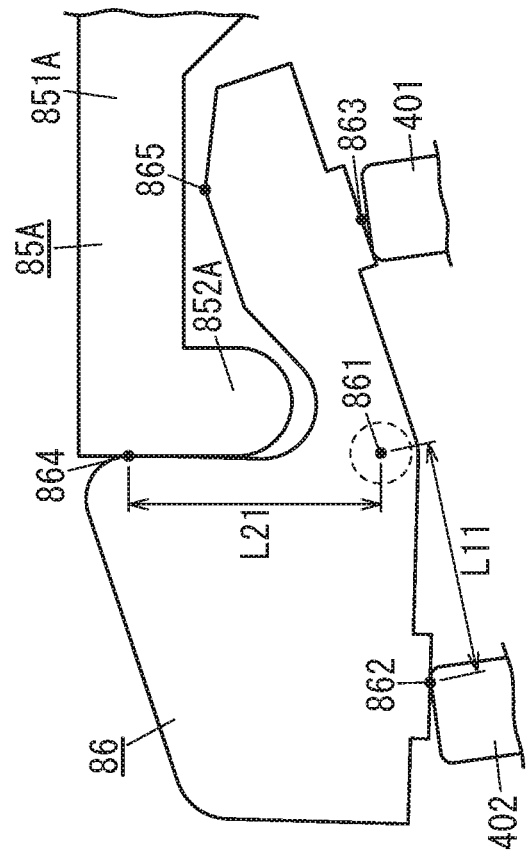
FIG. 9B is an enlarged view of the region Z1 shown in FIG. 9A.

The lever member 86 is configured to be rotatable between a first rotational position (i.e., the position shown in FIGS. 10A and 10B) and a second rotational position (i.e., the position shown in FIGS. 9A and 9B). The lever member 86 includes a fulcrum (link fulcrum) 861, points of load (points of link load) 862, 863, and points of effort (points of link effort) 864, 865, as shown in FIGS. 9B and 10B. FIGS. 9B and 10B respectively illustrate the region Z1 shown in FIGS. 9A and 10A on a larger scale with its shadow removed. That is to say, the lever member 86 includes two sets of points of load and effort provided for the first button 401 and the second button 402, respectively. The fulcrum 861 is the rotational axis of the lever member 86. When subjected to force applied at the point of effort 865, the lever member 86 rotates around the fulcrum 861 from the second rotational position to the first rotational position, applies force to (the first button 401 of) the operating member 4 at the point of load 863 paired with the point of effort 865, and thereby moves the operating member 4. Likewise, when subjected to force applied at the point of effort 864, the lever member 86 rotates around the fulcrum 861 from the first rotational position to the second rotational position, applies force to (the second button 402 of) the operating member 4 at the point of load 862 paired with the point of effort 864, and thereby moves the operating member 4.

The point of load 862 is located at a first distance L11 from the fulcrum 861. The point of effort 864 is located at a second distance L21 from the fulcrum 861. The point of load 863 is located at a first distance L12 from the fulcrum 861. The point of effort 865 is located at a second distance L22 from the fulcrum 861. In this case, the second distance L21 is longer than the first distance L11 (i.e., L21>L11), and the second distance L22 is longer than the first distance L12 (i.e., L22>L12).

Specifically, the press member 85A includes a first portion 851A extending horizontally, and a second portion 852A protruding downward from a left end portion of the first portion 851A. The tip end surface (lower surface) of the second portion 852A is a curved surface, which is curved such that a horizontal center portion thereof is raised downward. The lever member 86 is formed in a similar shape to the operating member 4. A surface, facing the operating member 4, of the lever member 86 is formed in a V shape such that a horizontal center portion thereof is raised downward.

At the second rotational position, the lever member 86 tilts diagonally upward to the right with respect to the upper surface of the first case 21 such that the point of load 863 is located above the point of load 862. Allowing the press member 85A to move linearly to the right in such a state makes the second portion 852A of the press member 85A apply downward force to the lever member 86 at the point of effort 865, thus turning the lever member 86 to the first rotational position. In the meantime, the point of load 863 moves downward, and therefore, the lever member 86 applies downward force to the first button 401 at the point of load 863. On the other hand, at the first rotational position, the lever member 86 tilts diagonally upward to the left with respect to the upper surface of the first case 21 such that the point of load 862 is located above the point of load 863. Allowing the press member 85A to move linearly to the left in such a state makes the left end portion of the first portion 851A of the press member 85A apply leftward force to the lever member 86 at the point of effort 864, thus turning the lever member 86 to the second rotational position. In the meantime, the point of load 862 moves downward, and therefore, the lever member 86 applies downward force to the second button 402 at the point of load 862. In short, as the press member 85A moves horizontally, the lever member 86 turns around the fulcrum 861 bidirectionally, thus seesawing between the first rotational position and the second rotational position.

In this manner, when subjected to the force (effort) applied from the press member 85A at the point of effort 864, the lever member 86 moves from the first rotational position to the second rotational position, applies force (load) to (the second button 402 of) the operating member 4 at the point of load 862, and thereby interlocks the operating member 4 with the crescent lock 81. Also, when subjected to the force (effort) applied from the press member 85A at the point of effort 865, the lever member 86 moves from the second rotational position to the first rotational position, applies force (load) to (the first button 401 of) the operating member 4 at the point of load 863, and thereby interlocks the operating member 4 with the crescent lock 81.

Figure 3:
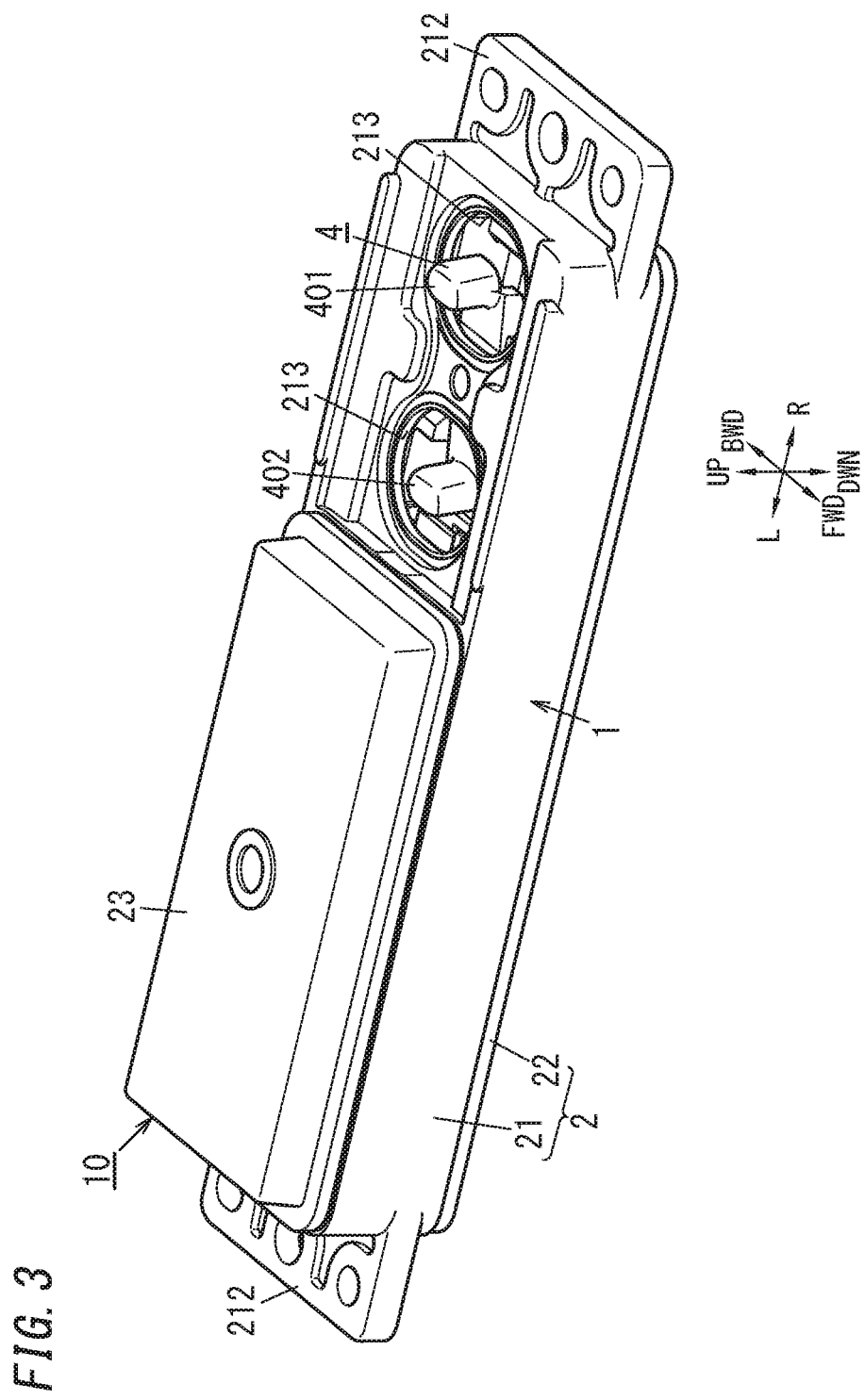
FIG. 3 is a perspective view of the input device.
Figure 4:
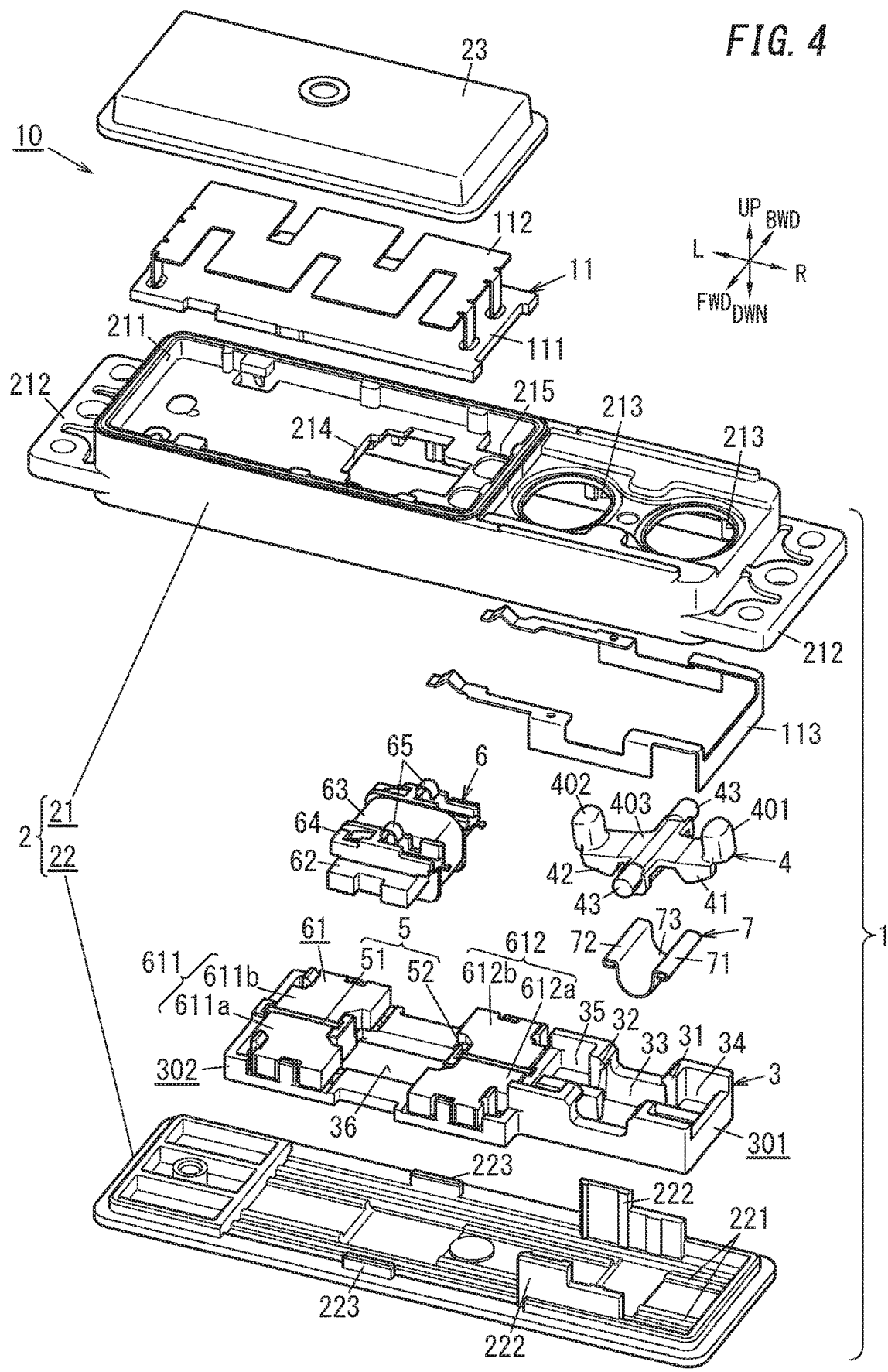
FIG. 4 is an exploded perspective view of the input device.

Also, on the upper surface of the first case 21 of the input device 10, a pair of guide walls 261A for regulating the movement of the press member 85A in the forward and backward directions are provided in the front and rear of the pair of through holes 213 (see FIG. 3). In addition, the housing 83 is further provided with a regulating structure for regulating the vertical movement of the press member 85A by vertically sandwiching the press member 85A. The pair of guide walls 216A and the regulating structure regulate the direction of movement of the press member 85A, thus allowing the press member 85A to move only horizontally. The pair of guide walls 216A further includes a bearing structure for supporting a shaft defining the fulcrum 861 of the lever member 86. The rotational axis of this shaft is the fulcrum 861. That is to say, the lever member 86 is rotatable while being supported by the first case 21.

As can be seen from the foregoing description, the lock device 8A with sensor according to the first variation includes the input device 10, the crescent lock 81, and the link mechanism 82A. The link mechanism 82A interlocks the operating member 4 with the crescent lock 81. This configuration allows the operating member 4 of the input device 10 to be indirectly operated by the crescent lock 81, and also allows the operating member 4 to change its operating state depending on the state of the crescent lock 81, namely, whether the crescent lock 81 is locked or unlocked. That is to say, in this lock device 8A with sensor, the input device 10 integrated with the crescent lock 81 is able to detect locking or unlocking of the crescent lock 81. This allows the input device 10 to transmit detection information, indicating whether the crescent lock 81 is locked or unlocked, from the signal processing circuit 11 to a receiver, for example, by using the electrical energy generated by the power generating unit 6 in response to the operation of the operating member 4, every time the crescent lock 81 is operated.

Also, according to the first variation, the link mechanism 82A includes: the press member 85A interlocked with the crescent lock 81; and the lever member 86 rotatable between the first rotational position and the second rotational position. The lever member 86 includes the fulcrum 861 serving as a rotational axis of the lever member 86, the point of load 863 (862) located at the first distance L12 (L11) from the fulcrum 861, and the point of effort 865 (864) located at the second distance L22 (L21), which is longer than the first distance L12 (L11), from the fulcrum 861. The lever member 86 is configured to, when subjected to the force applied from the press member 85A at the point of effort 864, move from the first rotational position to the second rotational position, apply force to the operating member 4 at the point of load 862 and thereby interlock the operating member 4 with the crescent lock 81. This configuration allows the press member 85A to apply force to the operating member 4 via the lever member 86. Thus, the "principle of leverage" reduces the force required for operating the operating member 4 compared to a configuration with no lever member 86. Therefore, a person operating the crescent lock 81 feels, while operating the crescent lock 81, a sense of force closer to a situation where the input device 10 is not provided.

According to this first variation, the link mechanism 82A is configured to move the operating member 4 in such a direction that the first pressing portion 41 comes closer toward the second holding portion 32 while the crescent lock 81 is switching from the locked state to the unlocked state. However, this is only an example and should not be construed as limiting. Alternatively, the link mechanism 82A may also be configured to move the operating member 4 in such a direction that the first pressing portion 41 comes closer toward the second holding portion 32 while the crescent lock 81 is switching from the unlocked state to the locked state.

(Second Variation)

Figure 11:
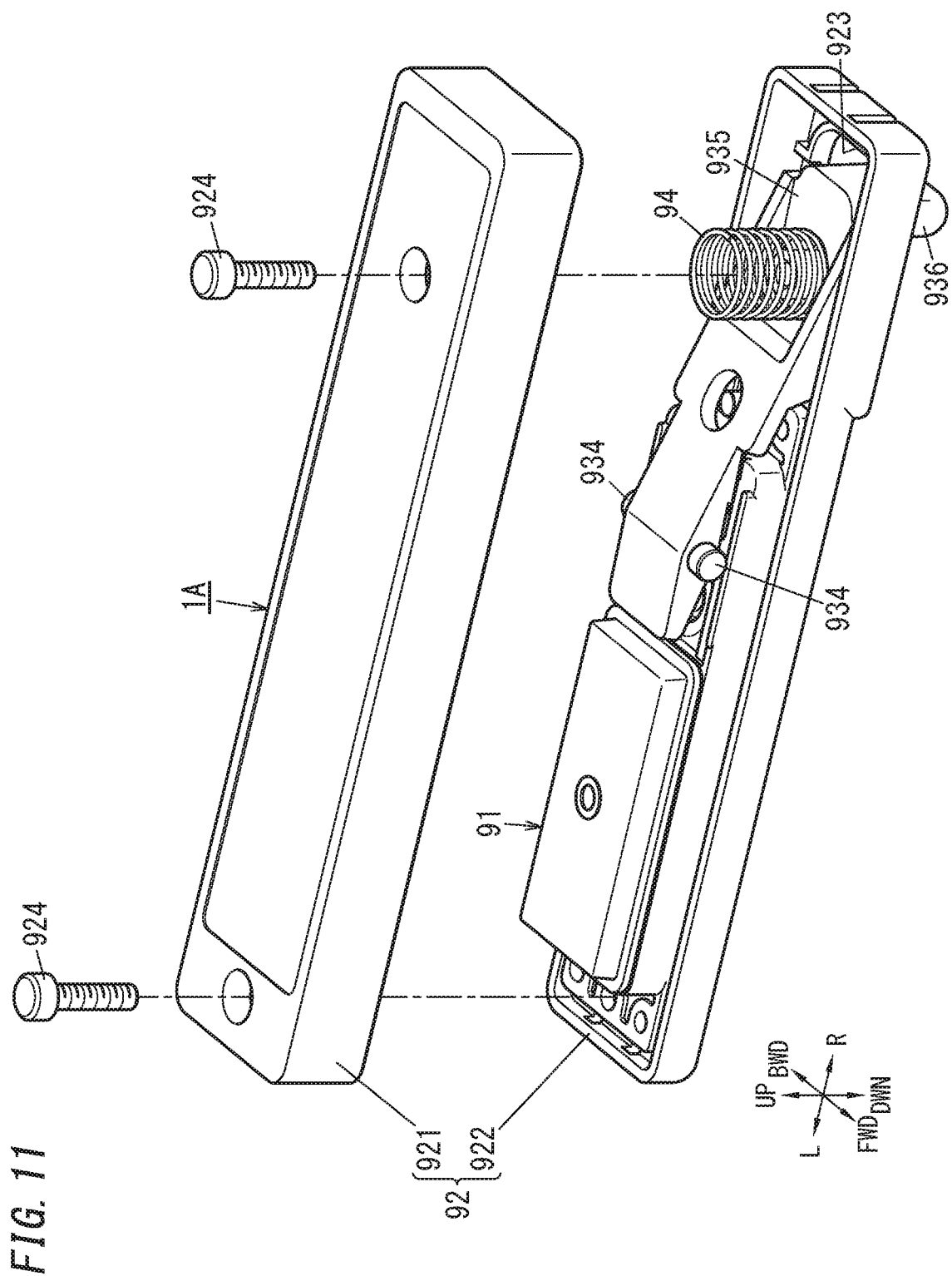
FIG. 11 is an exploded perspective view of a power generator according to a second variation.
Figure 12:
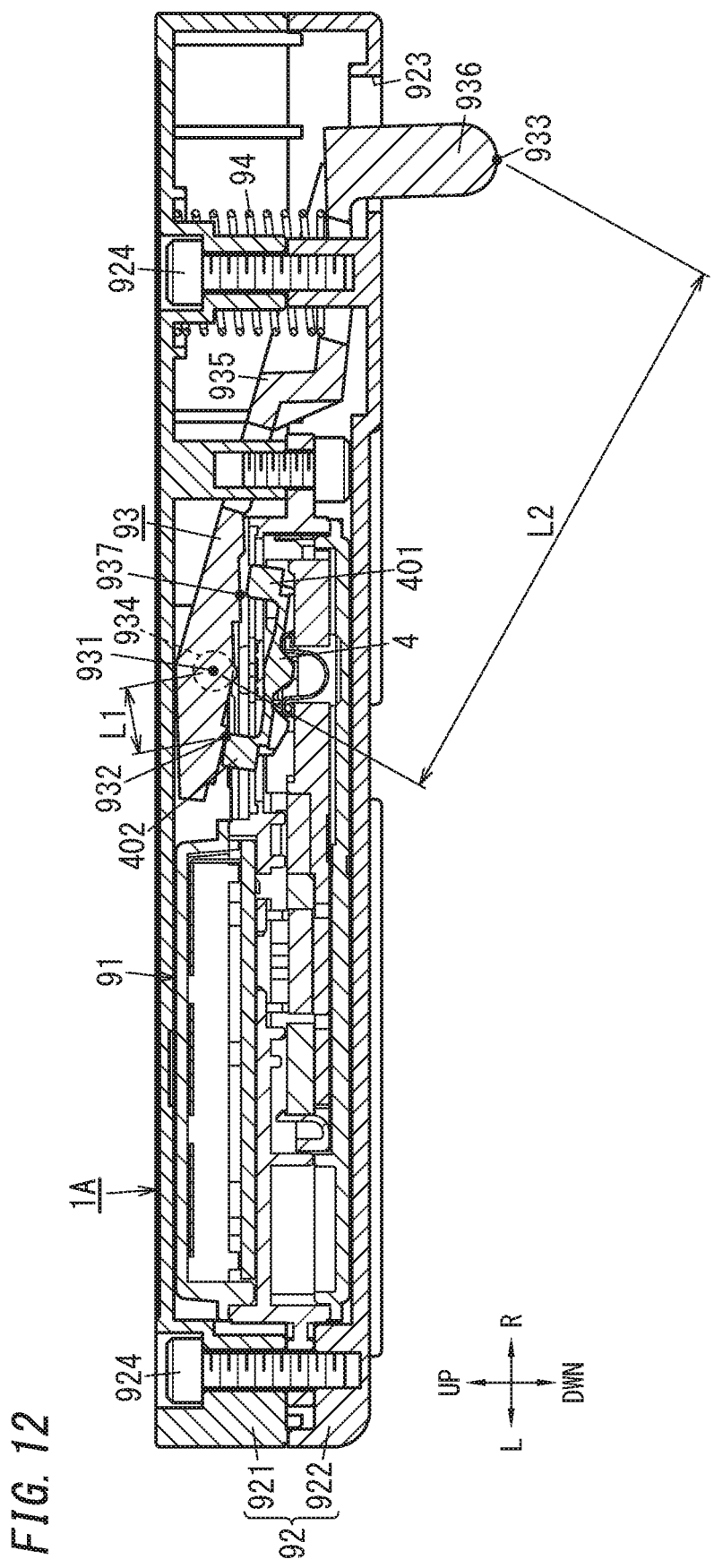
FIG. 12 is a cross-sectional view of the power generator.

Next, a power generator 1A according to a second variation will be described with reference to FIGS. 11 and 12. In the following description, the respective directions are defined just as indicated by the "up," "down," "left," "right," "front," and "rear" arrows in FIGS. 11 and 12 as in the embodiment described above. However, these directions are only an example and should not be construed as limiting the directions in which the power generator 1A is used.

The power generator 1A according to this second variation includes a built-in device 91 with the same configuration as the input device 10 according to the embodiment described above. This power generator 1A further includes an outer casing 92, a handle 93, and a restoration spring 94. That is to say, the input device 10 according to the embodiment described above is used as one constituent member (i.e., the built-in device 91) of the power generator 1A according to this second variation. Thus, in the following description, any constituent member of the built-in device 91, having the same function as a counterpart of the input device 10 according to the exemplary embodiment described above, will be designated by the same reference numeral as that counterpart's, and a detailed description thereof will be omitted herein as appropriate.

In this power generator 1A, the built-in device 91, the handle 93, and the restoration spring 94 are housed in the outer casing 92 so that only a part of the handle 93 (i.e., a portion with a point of effort 933 thereof) is exposed from the outer casing 92. The handle 93 includes a fulcrum 931 and is supported by the outer casing 92 so as to turn around the fulcrum 931 between a first rotational position and a second rotational position. The handle 93 includes a point of load 932 at which force is applied to (the second button 402 of) the operating member 4. In this power generator 1A, when subject to the force applied to its portion exposed from the outer casing 92 (i.e., the portion with the point of effort 933), the handle 93 turns from the first rotational position to the second rotational position, thus applying force to (the second button 402 of) the operating member 4 at the point of load 932 and thereby moving the operating member 4. Also, when the force is no longer applied to the handle 93 at the point of effort 933, the restoring force of the restoration spring 94 makes the handle 93 turn from the second rotational position to the first rotational position. In this case, the handle 93 applies force to (the first button 401 of) the operating member 4 at a contact portion 937 (to be described later), thereby moving the operating member 4.

As can be seen, in this power generator 1A, when subjected to the force applied at the point of effort 933, the handle 93 moves the operating member 4 in such a direction that the second pressing portion 42 (see FIG. 2B) comes closer toward the first holding portion 31 (see FIG. 2B). On the other hand, when the force is no longer applied to the handle 93 at the point of effort 933, the handle 93 moves the operating member 4 in such a direction that the first pressing portion 41 (see FIG. 1B) comes closer toward the second holding portion 32 (see FIG. 1B). This allows the operating member 4 to be indirectly operated via the handle 93, and the operating state of the operating member 4 changes depending on whether or not force is applied to the handle 93. This power generator 1A may be used as a sensor for detecting opening or closing of a window or a door, or a sensor for determining whether or not any person is seated on a chair or a seat.

The outer casing 92 includes a first outer case 921 and a second outer case 922. The first outer case 921 is formed in the shape of a box with a bottom opening. The second outer case 922 has the shape of a rectangular plate, and is joined to the first outer case 921 with screws 924 so as to close the opening of the first outer case 921. In this manner, the first outer case 921 and the second outer case 922 are vertically combined and joined together to form the outer casing 92. At a right end portion of the second outer case 922, there is an operating hole 923. The operating hole 923 vertically runs through the second outer case 922 and is provided to expose the point of effort 933 of the handle 93 from the lower surface of the second outer case 922.

The handle 93 is configured to be rotatable between a first rotational position (i.e., the position shown in FIG. 12) and a second rotational position. The handle 93 includes the fulcrum 931, the point of load 932, and the point of effort 933 as shown in FIG. 12. The fulcrum 931 serves as a rotational axis of the handle 93. Specifically, the handle 93 includes a pair of rotational shaft portions 934 having a cylindrical shape and protruding in the forward and backward directions. The rotational axis of this pair of rotational shaft portions 934 defines the fulcrum 931. When subjected to upward force applied at the point of effort 933, the handle 93 turns around the fulcrum 931 from the first rotational position to the second rotational position, applies force to (the second button 402 of) the operating member 4 at the point of load 932, and thereby moves the operating member 4.

The point of load 932 is located at a first distance L1 from the fulcrum 931, and the point of effort 933 is located at a second distance L2 from the fulcrum 931, where the second distance L2 is longer than the first distance L1 (i.e., L2>L1).

Specifically, the handle 93 further includes a pressure receiving portion 935 receiving the restoring force of the restoration spring 94, a protruding portion 936 including the point of effort 933, and the contact portion 937 to press the first button 401. A surface, facing the operating member 4, of the handle 93 is formed in a V-shape such that a horizontal center portion thereof is raised downward. In this V-shaped surface, a portion located on the left-hand side of the horizontal center portion thereof includes the point of load 932, and a portion located on the right-hand side of the horizontal center portion includes the contact portion 937. The pressure receiving portion 935 is provided on the right-hand side of the contact portion 937. The protruding portion 936 protrudes downward from a right end portion of the pressure receiving portion 95 through the operating hole 923. The tip end portion (lower end portion) of the protruding portion 936 protruding from the outer casing 92 includes the point of effort 933. Between the upper surface of the pressure receiving portion 935 and the lower surface of the first outer case 921, arranged is the restoration spring 94, which may be implemented as a compression coil spring.

When the handle 93 is located at the first rotational position, the point of load 932 is located above the contact portion 937. Applying upward force to the handle 93 at the point of effort 933 in such a state makes the handle 93 turn to the second rotational position. In the meantime, the point of load 932 moves downward, and therefore, the handle 93 applies force to the second button 402 at the point of load 932. Thereafter, when the force is no longer applied to the handle 93 at the point of effort 933, the restoring force of the restoration spring 94 presses the pressure receiving portion 935 downward, thus turning the handle 93 to the first rotational position. In the meantime, the contact portion 937 moves downward, and therefore, the handle 93 applies downward force to the first button 401 at the contact portion 937. In short, when subjected to the force applied at the point of effort 933, the handle 93 turns around the fulcrum 931 bidirectionally, thus seesawing between the first rotational position and the second rotational position.

In this manner, when subjected to force applied at the point of effort 933, the handle 93 moves from the first rotational position to the second rotational position, applies force to (the second button 402 of) the operating member 4 at the point of load 932 and thereby makes the operating member 4 operate in response to the application of force at the point of effort 933. When the force is no longer applied to the handle 93 at the point of effort 933, the handle 93 moves from the second rotational position to the first rotational position, applies force to (the first button 401 of) the operating member 4 at the contact portion 937, and thereby makes the operating member 4 operate in response to the application of force at the point of effort 933. As can be seen, in the power generator 1A according to the second variation, every time force is applied to the handle 93 at the point of effort 933, the same series of operations of applying force to the second button 402 and the first button 401 in this order are performed. Also, when the force is no longer applied to the handle 93 at the point of effort 933, the handle 93 has its pressure receiving portion 935 pressed by the restoration spring 94 and applies force to the first button 401 at the contact portion 937. Thus, the pressure receiving portion 935 corresponds to the point of effort and the contact portion 937 corresponds to the point of load.

As can be seen from the foregoing description, the power generator 1A according to the second variation further includes the handle 93 rotatable between the first rotational position and the second rotational position. The handle 93 includes the fulcrum 931 serving as a rotational axis of the handle 93, the point of load 932 located at the first distance L1 from the fulcrum 931, and the point of effort 933 located at the second distance L2, which is longer than the first distance L1, from the fulcrum 931. The handle 93 is configured to, when subjected to the force applied at the point of effort 933, turn from the first rotational position to the second rotational position, apply force to the operating member 4 at the point of load 932, and thereby move the operating member 4. According to this configuration, the "principle of leverage" reduces the force required for operating the operating member 4 compared to a configuration with no handle 93, thus reducing operating force required for operating the power generator 1A.

In addition, according to this second variation, every time the handle 93 is subjected to pressure applied at the point of effort 933, the same series of operations of applying force to the second button 402 and the first button 401 in this order are performed by the restoration spring 94. Thus, performing a single series of operations on the power generator 1A makes the movable member 3 move twice between the first position and the second position, thus increasing the amount of electricity generated by the power generating unit 6.

REFERENCE SIGNS LIST

1 Power Generator
2 Stationary Member
3 Movable Member
4 Operating Member
5 Permanent Magnet
6 Power Generating Unit
7 Spring Member
8, 8A Lock Device with Sensor
10 Input Device
11 Signal Processing Circuit
31 First Holding Portion
32 Second Holding Portion
41 First Pressing Portion
42 Second Pressing Portion
51 First Magnet
52 Second Magnet
61 Mover
62 Core
63 Coil
71 First End Portion
72 Second End Portion
73 Curved Portion
81 Crescent Lock
82, 82A Link mechanism
86 Lever Member
93 Handle
311 First Holding Piece
321 Second Holding Piece
411 First Sloped Surface
421 Second Sloped Surface
611 First Movable Piece
612 Second Movable Piece
861 (Link) Fulcrum
862, 863 Point of (Link) Load
864, 865 Point of (Link) Effort
931 Fulcrum
932 Point of Load
933 Point of Effort
L1 First Distance
L2 Second Distance

The invention claimed is:

1. A power generator comprising
a stationary member;
a movable member configured to be movable in a predetermined direction between a first position and a second position with respect to the stationary member;
an operating member configured to be movable with respect to the stationary member separately from the movable member;
a permanent magnet configured to generate magnetic attraction to hold the movable member at each of the first position and the second position;
a power generating unit including a mover moving in conjunction with the movable member and configured to convert kinetic energy of the mover into electrical energy; and
a spring member held by the movable member and configured to transmit force from the operating member to the movable member,
the movable member including a first holding portion and a second holding portion, which are spaced apart from each other in the predetermined direction and which are located closer to the first position and the second position, respectively,
the movable member being configured to hold the spring member by interposing the spring member between the first holding portion and the second holding portion,
the operating member including a first pressing portion and a second pressing portion, which are spaced apart from each other in the predetermined direction and which are located closer to the first position and the second position, respectively,
the first pressing portion being arranged at such a position as to interpose the spring member between the first pressing portion itself and the second holding portion when the movable member is located at the first position,
the second pressing portion being arranged at such a position as to interpose the spring member between the second pressing portion itself and the first holding portion when the movable member is located at the second position,
the spring member being configured to, as the operating member moves in such a direction that the first pressing portion comes closer toward the second holding portion while the movable member is located at the first position, be compressed by the first pressing portion and the second holding portion and generate restoring force that causes the movable member to move toward the second position,
the spring member being configured to, as the operating member moves in such a direction that the second pressing portion comes closer toward the first holding portion while the movable member is located at the second position, be compressed by the second pressing portion and the first holding portion and generate restoring force that causes the movable member to move toward the first position.

2. The power generator of claim 1, wherein
the spring member is a leaf spring having a first end portion and a second end portion at both ends thereof in the predetermined direction, and
the spring member further includes a curved portion, of which curvature makes the spring member raised in its thickness direction, and which is located between the first end portion and the second end portion.

3. The power generator of claim 1, wherein
the first holding portion includes a pair of first holding pieces spaced apart from each other in a width direction perpendicular to the predetermined direction, the first holding portion being configured to make the pair of first holding pieces come into contact with the spring member,
the second holding portion includes a pair of second holding pieces spaced apart from each other in the width direction, the second holding portion being configured to make the pair of second holding pieces come into contact with the spring member,
the first pressing portion is located between the pair of first holding pieces in the width direction, and
the second pressing portion is located between the pair of second holding pieces in the width direction.

4. The power generator of claim 1, wherein
the movable member is held by the stationary member so as to be movable linearly in the predetermined direction.

5. The power generator of claim 1, wherein
the operating member is held by the stationary member so as to be rotatable between a first operating position and a second operating position,
the operating member is configured to move from the first operating position to the second operating position in such a direction that the first pressing portion comes closer toward the second holding portion and that the second pressing portion goes away from the first holding portion, and
the operating member is configured to move from the second operating position to the first operating position in such a direction that the second pressing portion comes closer toward the first holding portion and that the first pressing portion goes away from the second holding portion.

6. The power generator of claim 5, wherein
the operating member is configured to be movable with respect to the stationary member so as to move the first pressing portion and the second pressing portion in an operating direction intersecting with the predetermined direction,
the first pressing portion has a first sloped surface, which is sloped with respect to the operating direction and located at such a position as to face the second holding portion in the predetermined direction such that as the first pressing portion moves in the operating direction, distance to the second holding portion changes in the predetermined direction, and
the second pressing portion has a second sloped surface, which is sloped with respect to the operating direction and located at such a position as to face the first holding portion in the predetermined direction such that as the second pressing portion moves in the operating direction, distance to the first holding portion changes in the predetermined direction.

7. The power generator of claim 1, wherein
the power generating unit further includes:
a core; and
a coil wound around the core, and
the power generating unit is configured to generate power from the coil by causing a direction of magnetic flux passing through the core to change as the mover moves.

8. The power generator of claim 7, wherein
the mover includes a first movable piece and a second movable piece, which are located on both sides of the core in the predetermined direction, the first movable piece is configured to be in contact with the core when the movable member is located at the first position, the second movable piece is configured to be in contact with the core when the movable member is located at the second position, and the permanent magnet includes a first magnet secured to the first movable piece and a second magnet secured to the second movable piece.

9. The power generator of claim 1, further comprising a handle rotatable between a first rotational position and a second rotational position, wherein the handle includes a fulcrum serving as a rotational axis of the handle, a point of load located at a first distance from the fulcrum, and a point of effort located at a second distance, which is longer than the first distance, from the fulcrum, and the handle is configured to, when force is applied at the point of effort, turn from the first rotational position to the second rotational position, apply force to the operating member at the point of load, and thereby move the operating member.

10. An input device comprising:

the power generator of claim 1; and a signal processing circuit electrically connected to the power generating unit, and configured to output a signal by using the electrical energy generated by the power generating unit in response to operation of the operating member.

11. A lock device with sensor, comprising:

the input device of claim 10;

a crescent lock; and a link mechanism configured to interlock the operating member with the crescent lock.

12. The lock device with sensor of claim 11, wherein the link mechanism includes:

a press member interlocked with the crescent lock; and a lever member rotatable between a first rotational position and a second rotational position, the lever member includes a link fulcrum serving as a rotational axis of the lever member, a point of link load located at a first distance from the link fulcrum, and a point of link effort located at a second distance, which is longer than the first distance, from the link fulcrum, and the lever member is configured to, when force is applied by the press member at the point of link effort, move from the first rotational position to the second rotational position, apply force to the operating member at the point of link load, and thereby interlock the operating member with the crescent lock.

* * * * *